US010455136B2

(12) United States Patent
Mizukami

(10) Patent No.: US 10,455,136 B2
(45) Date of Patent: Oct. 22, 2019

(54) INFORMATION PROCESSING TO INDICATE FOCUSABLE AREAS IN AN IMAGE

(71) Applicant: SONY CORPORATION, Tokyo (JP)

(72) Inventor: Akifumi Mizukami, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/419,546

(22) PCT Filed: Sep. 4, 2013

(86) PCT No.: PCT/JP2013/005250
§ 371 (c)(1),
(2) Date: Feb. 4, 2015

(87) PCT Pub. No.: WO2014/041766
PCT Pub. Date: Mar. 20, 2014

(65) Prior Publication Data
US 2015/0229830 A1    Aug. 13, 2015

(30) Foreign Application Priority Data

Sep. 11, 2012    (JP) .................................. 2012-199049

(51) Int. Cl.
H04N 5/232    (2006.01)
G03B 13/36    (2006.01)
G03B 17/20    (2006.01)

(52) U.S. Cl.
CPC ......... H04N 5/23212 (2013.01); G03B 13/36 (2013.01); G03B 17/20 (2013.01); H04N 5/23219 (2013.01); H04N 5/23293 (2013.01)

(58) Field of Classification Search
CPC ........... H04N 5/23212; H04N 5/23219; H04N 5/23293
USPC .......................................................... 348/246
See application file for complete search history.

(56) References Cited

U.S. PATENT DOCUMENTS

| 2009/0009652 A1* | 1/2009 | Sudo ................. H04N 5/23293 348/349 |
| 2010/0097513 A1* | 4/2010 | Takada ............... G06K 9/00255 348/333.03 |
| 2012/0162492 A1* | 6/2012 | Akamatsu ............. G03B 13/36 348/345 |

FOREIGN PATENT DOCUMENTS

| JP | 62-034115 A | 2/1987 |
| JP | 04-178607 A | 6/1992 |
| JP | 09-043504 A | 2/1997 |
| JP | 2002-122906 A | 4/2002 |
| JP | 2003-241069 A | 8/2003 |
| JP | 2004-289214 A | 10/2004 |
| JP | 2005-202064 A | 7/2005 |
| JP | 2005-303522 A | 10/2005 |
| JP | 2007-003785 A | 1/2007 |
| JP | 2007-127923 A | 5/2007 |
| JP | 2007-199171 A | 8/2007 |
| JP | 2009098167 A * | 5/2009 |

(Continued)

Primary Examiner — Antoinette T Spinks
(74) Attorney, Agent, or Firm — Chip Law Group

(57) ABSTRACT

There is provided an information processing system comprising: circuitry configured to acquire information indicating whether at least one of plurality of areas included in a captured image captured by a capturing device are focusable; and to issue a signal to control a display to display first information indicating whether each of the plurality of areas are focusable.

24 Claims, 26 Drawing Sheets

(56) References Cited

FOREIGN PATENT DOCUMENTS

| | | | |
|---|---|---|---|
| JP | 2010-114547 | A | 5/2010 |
| JP | 2012-124555 | A | 6/2012 |

\* cited by examiner

[Fig. 1]
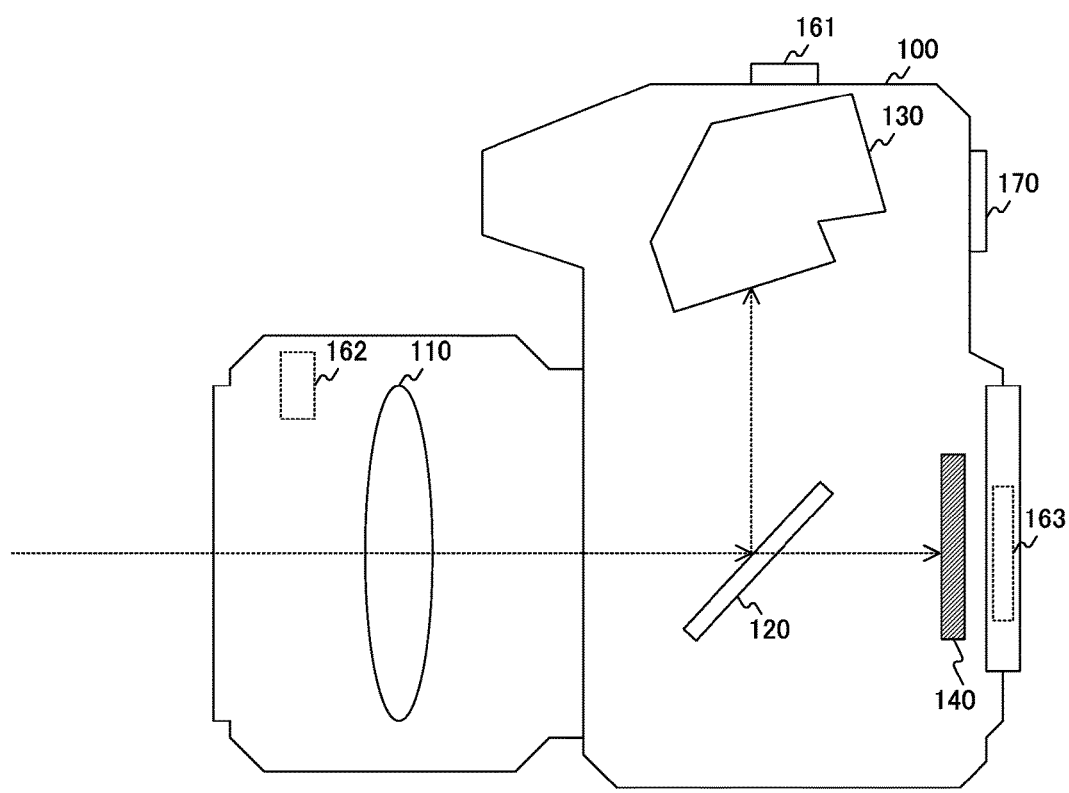

[Fig. 2]
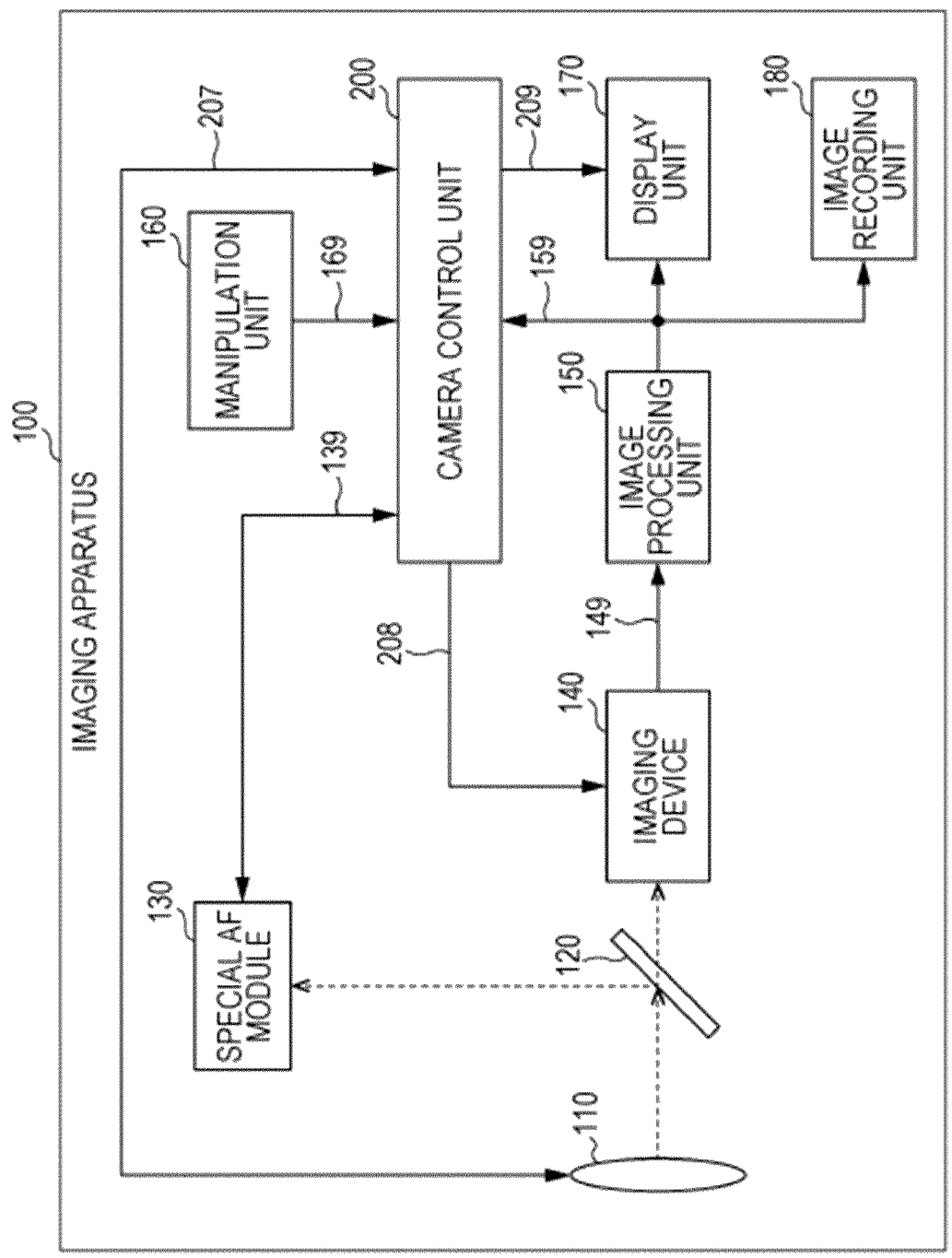

[Fig. 3]
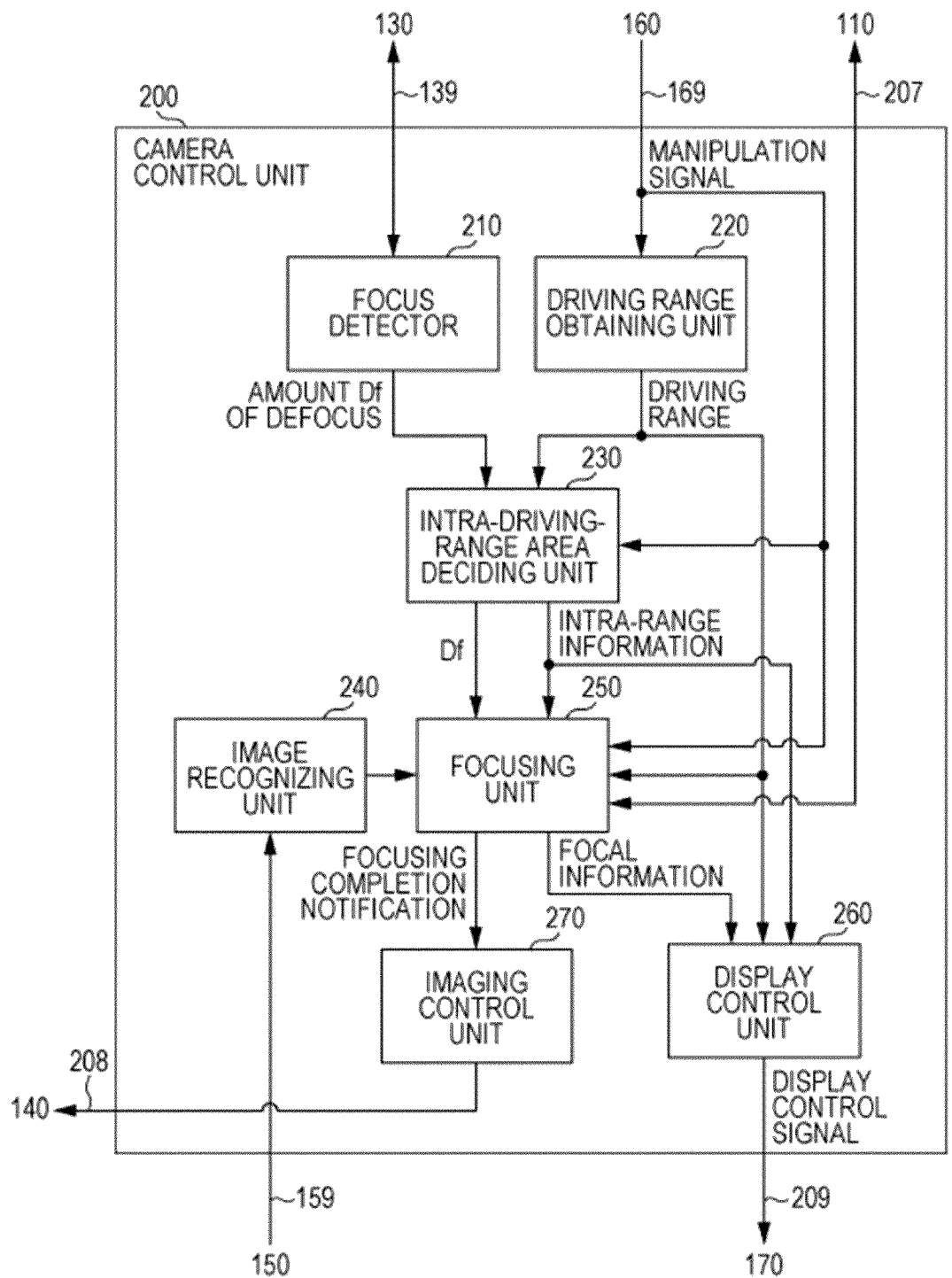

[Fig. 4]
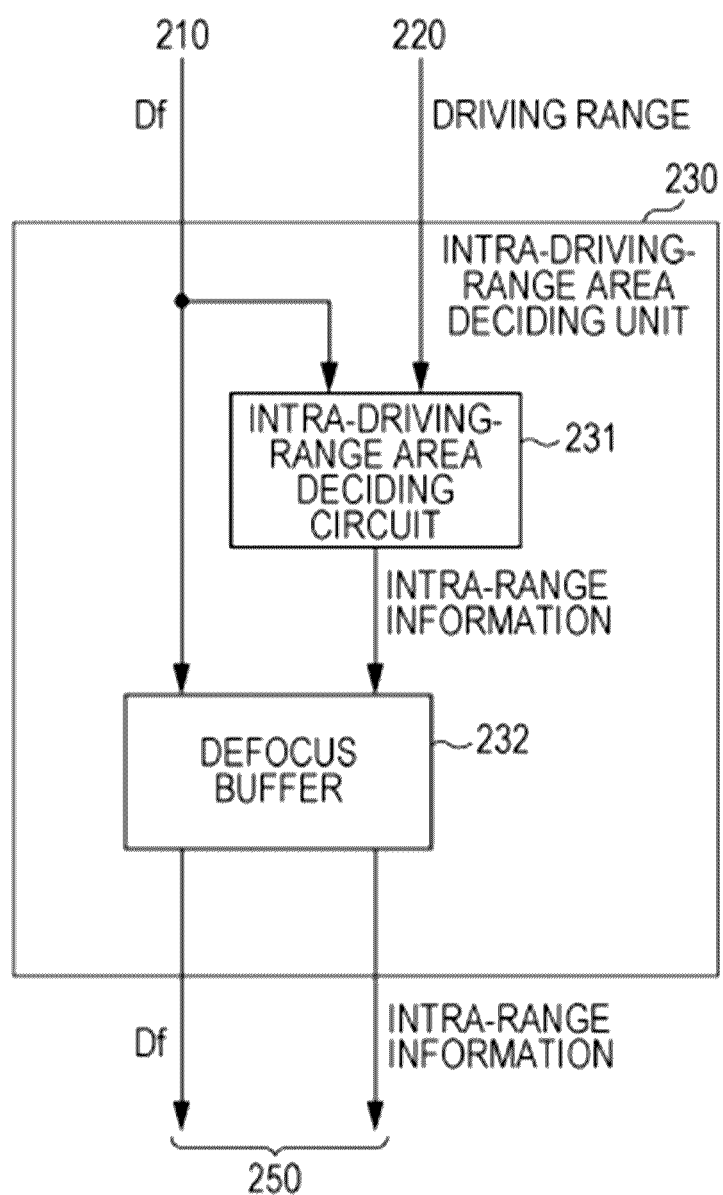

[Fig. 5]
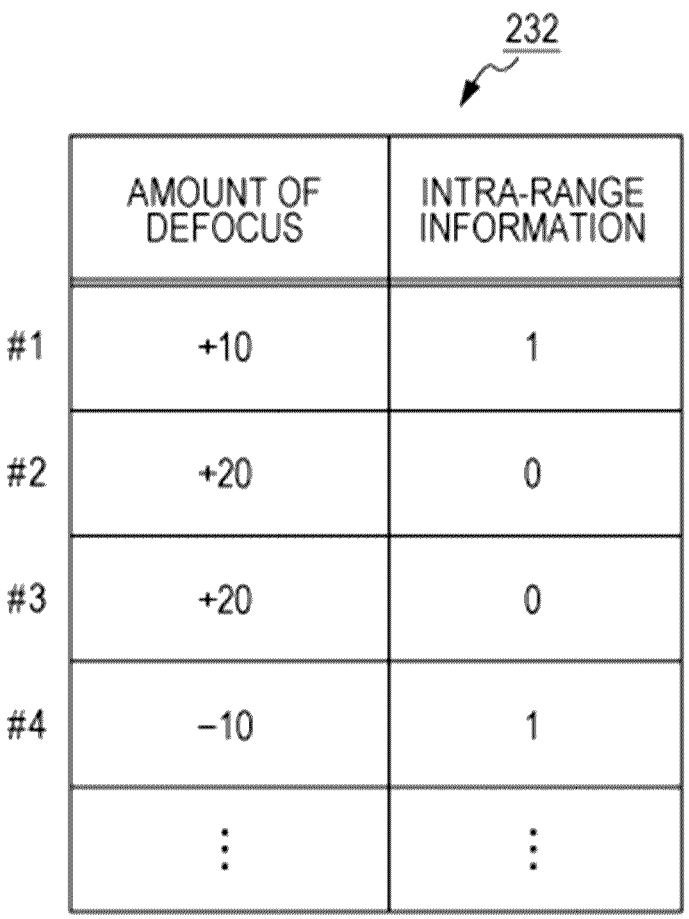

[Fig. 6]
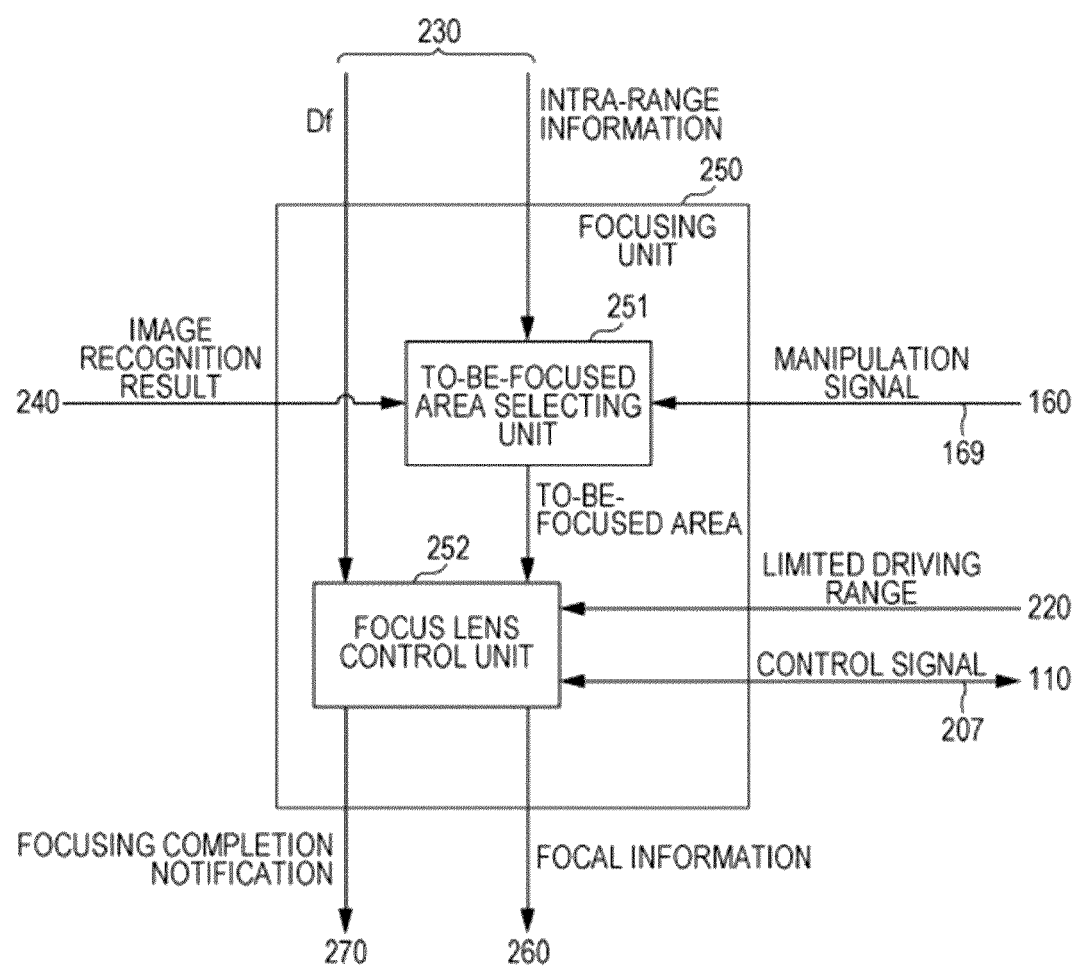

[Fig. 7]
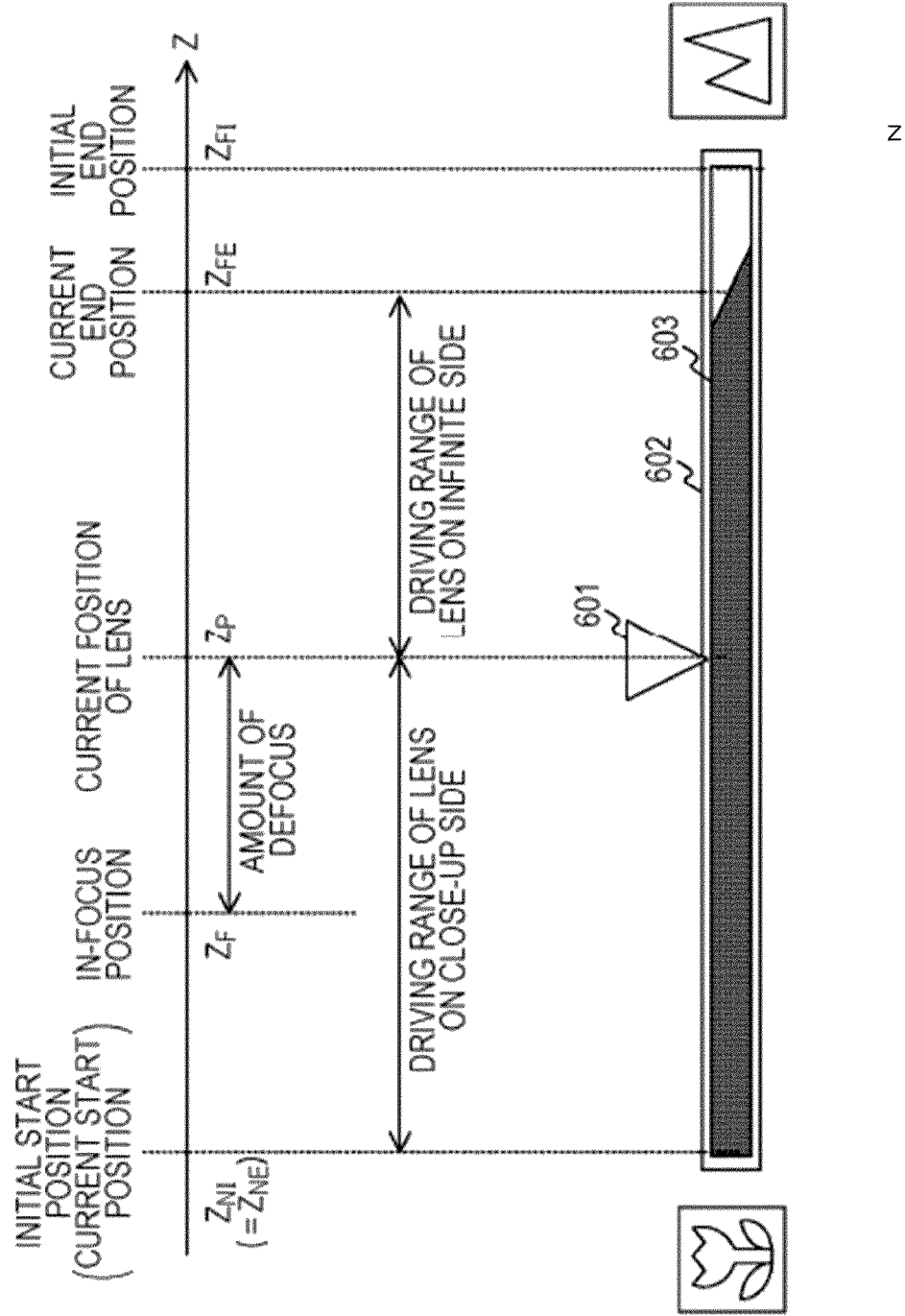

[Fig. 8]
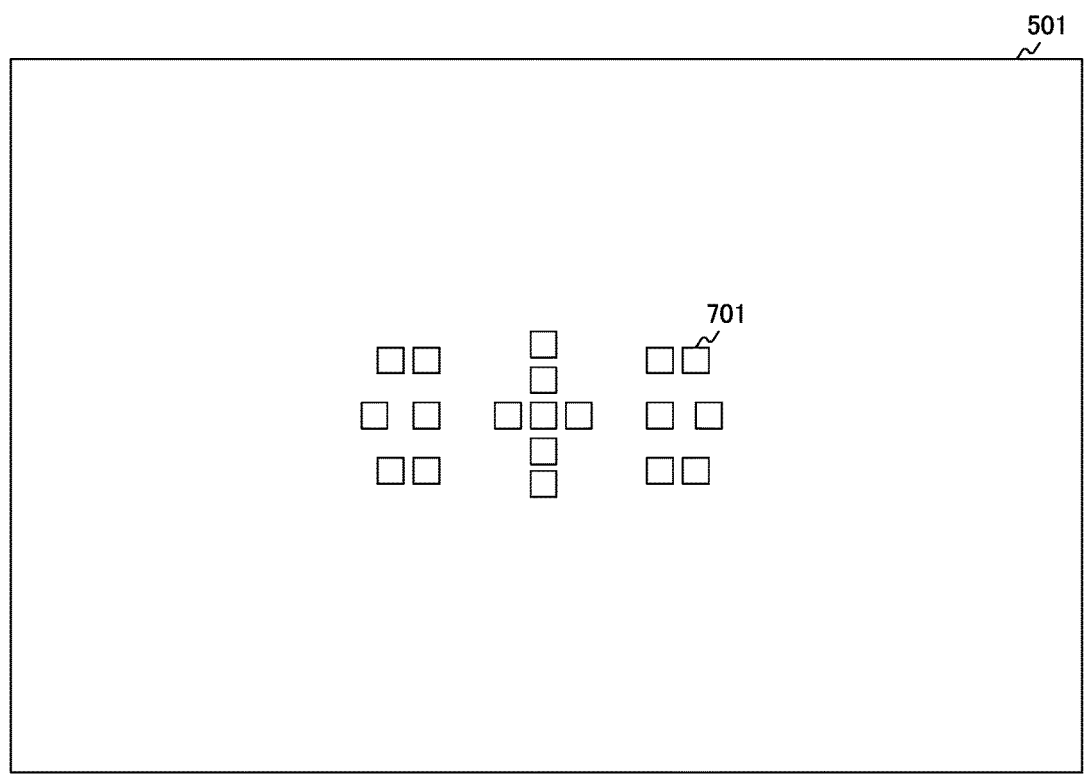

[Fig. 9]
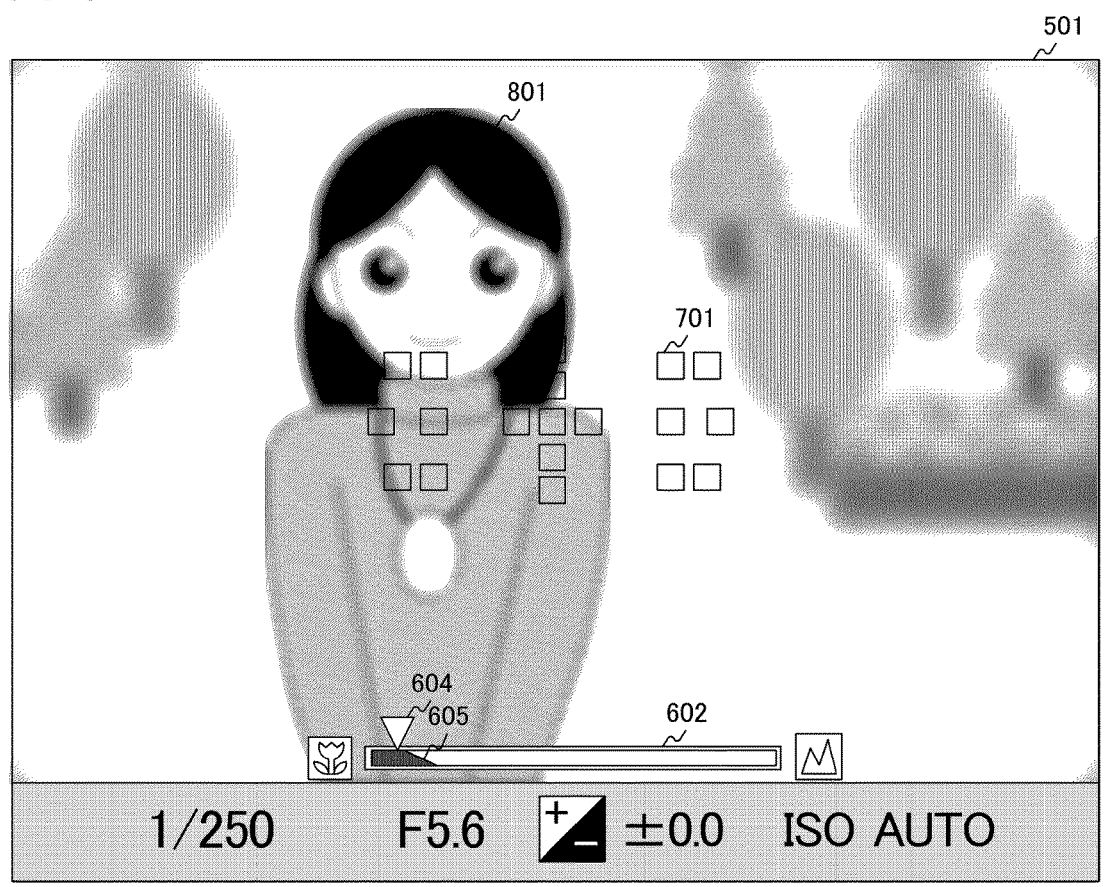

[Fig. 10]
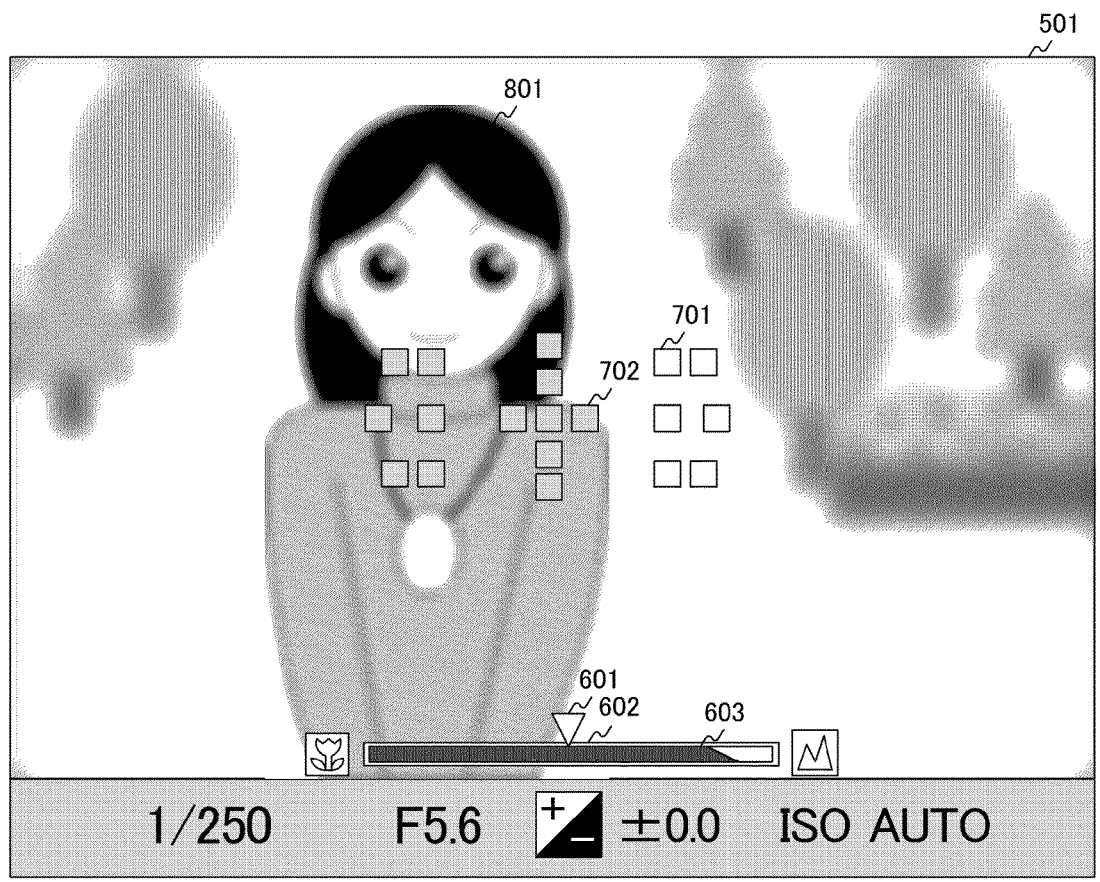

[Fig. 11]
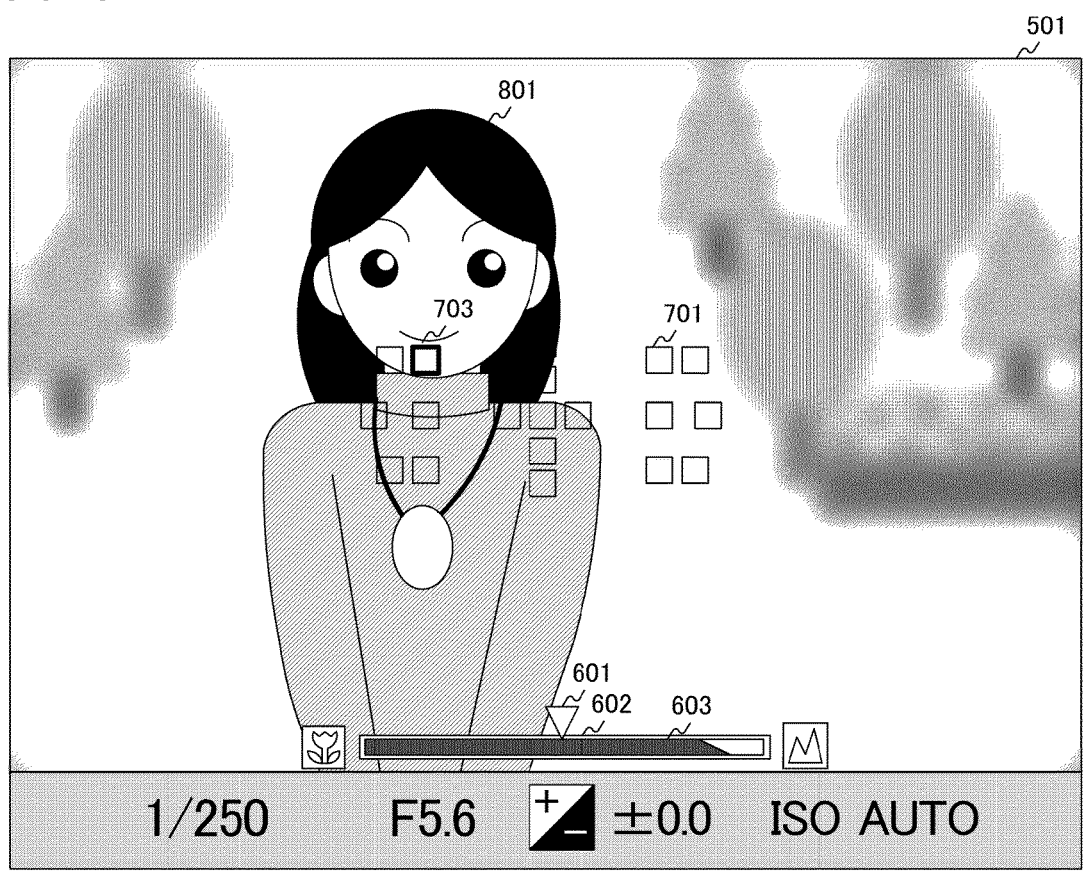

[Fig. 12]
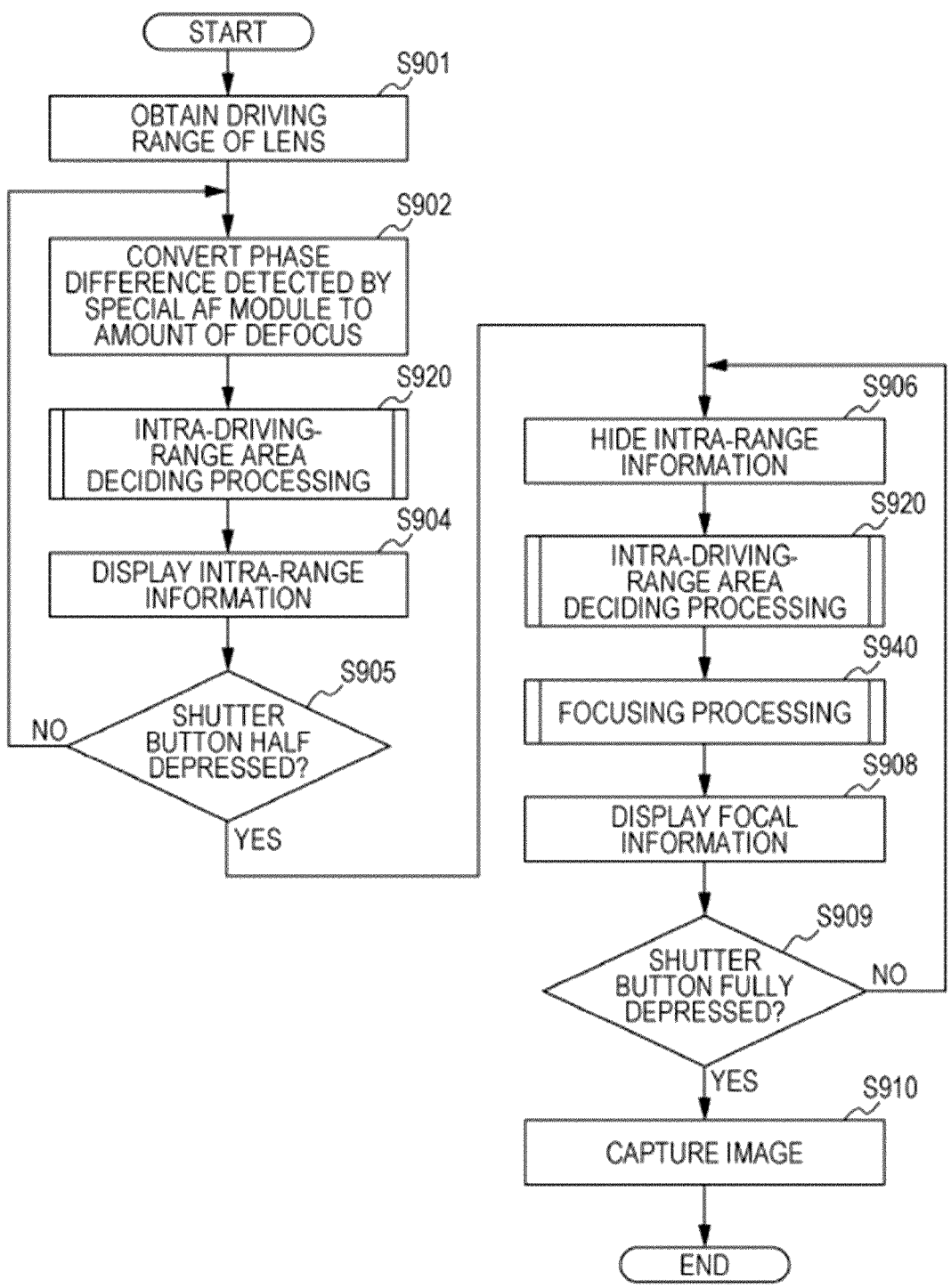

[Fig. 13]
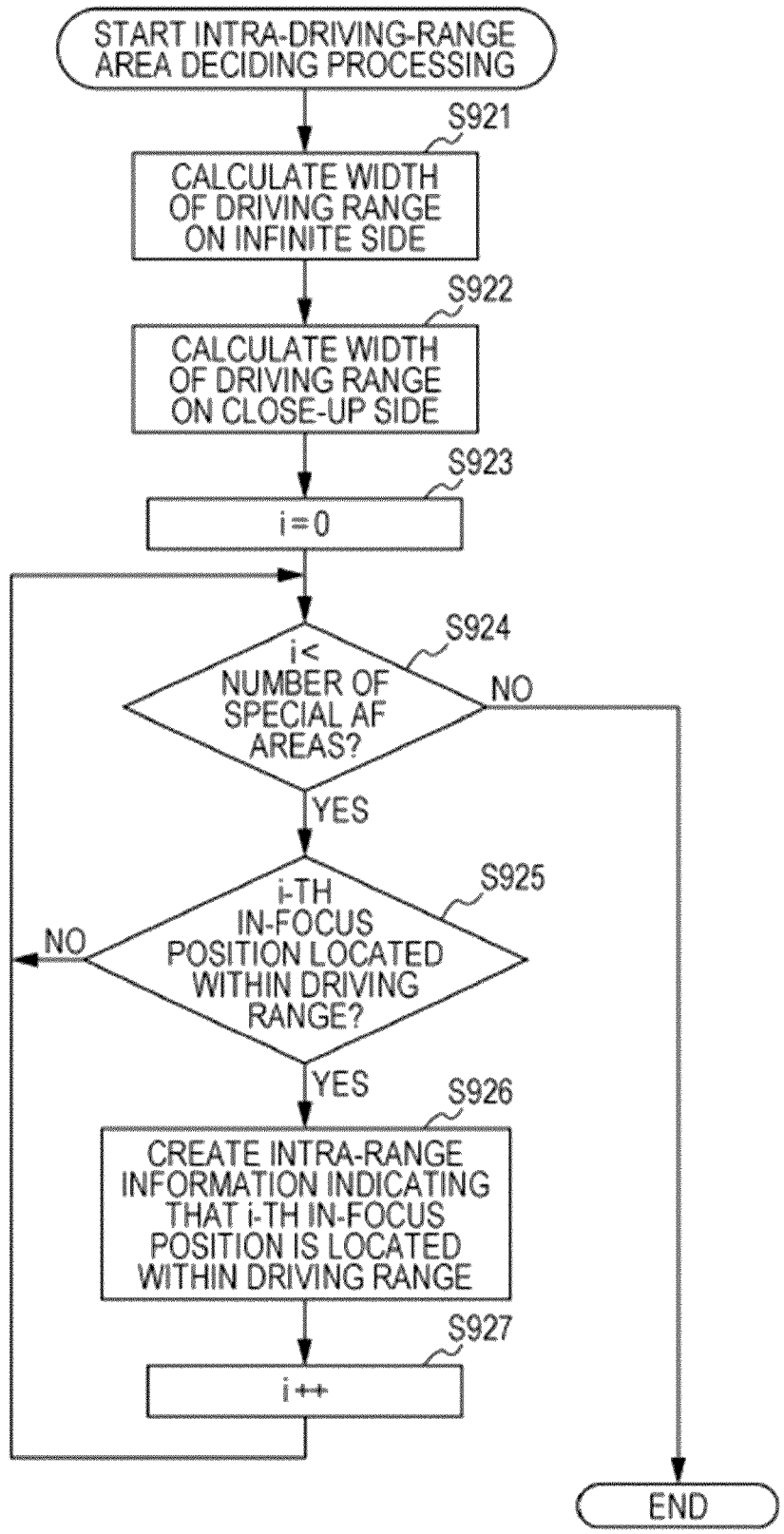

[Fig. 14]
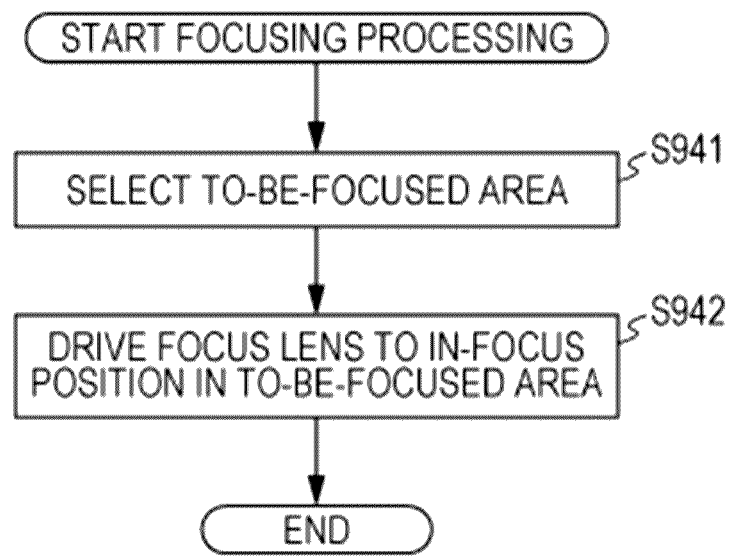

[Fig. 15]
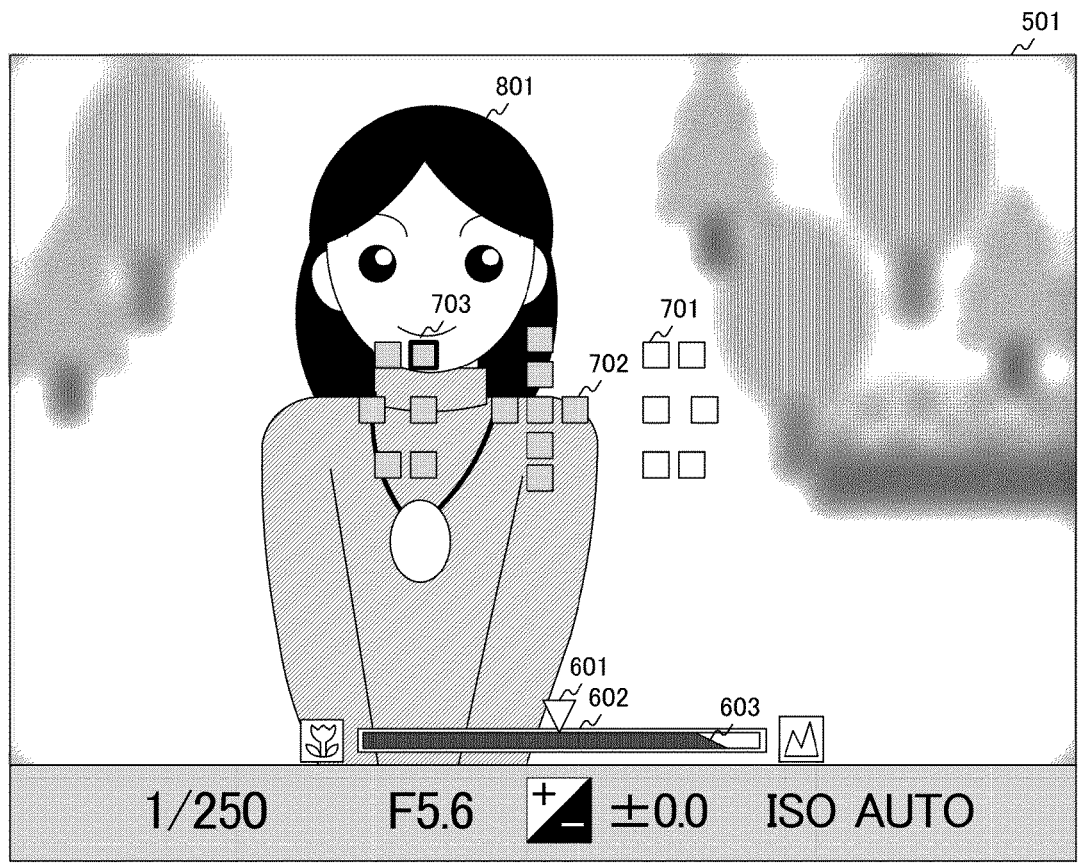

[Fig. 16]
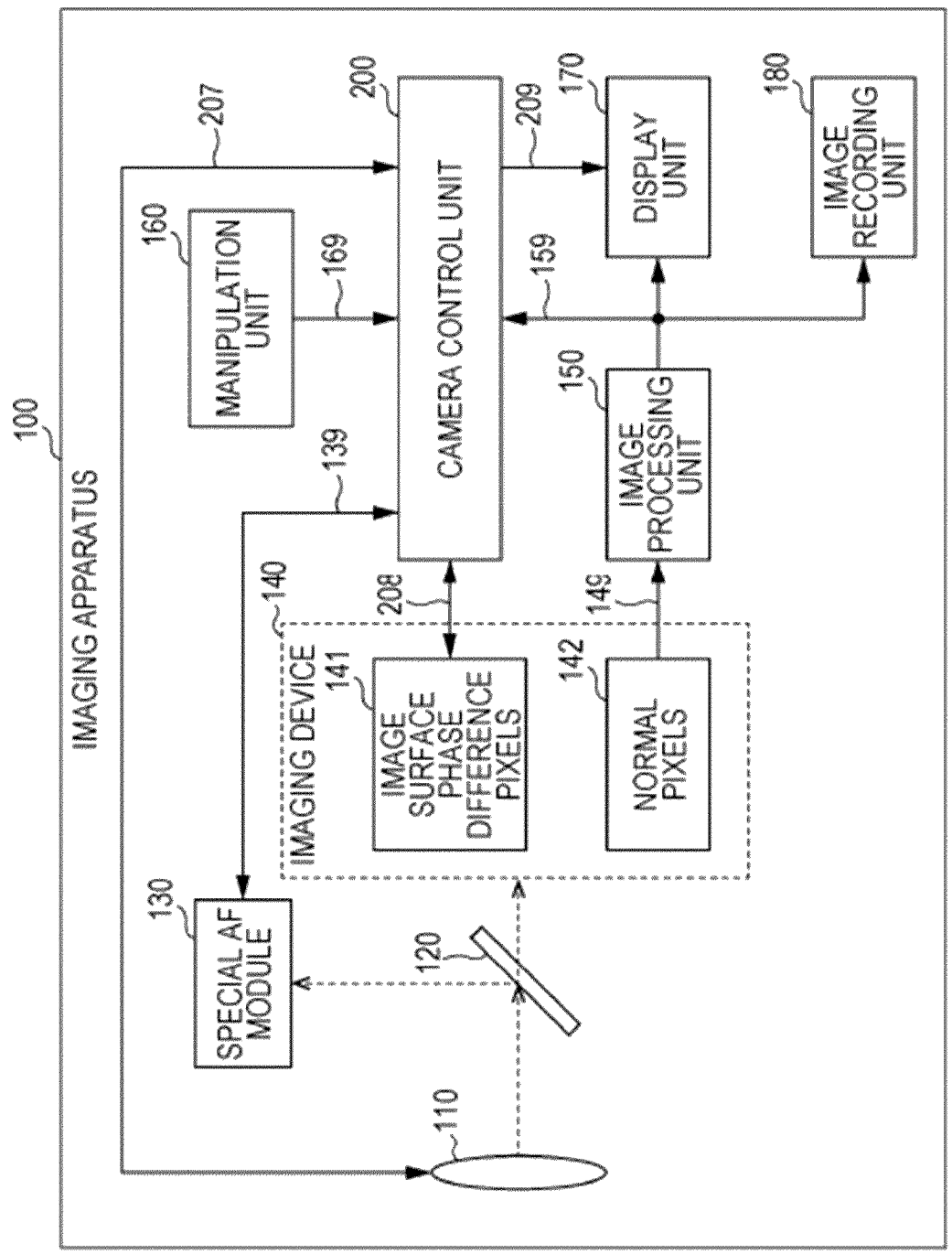

[Fig. 17]
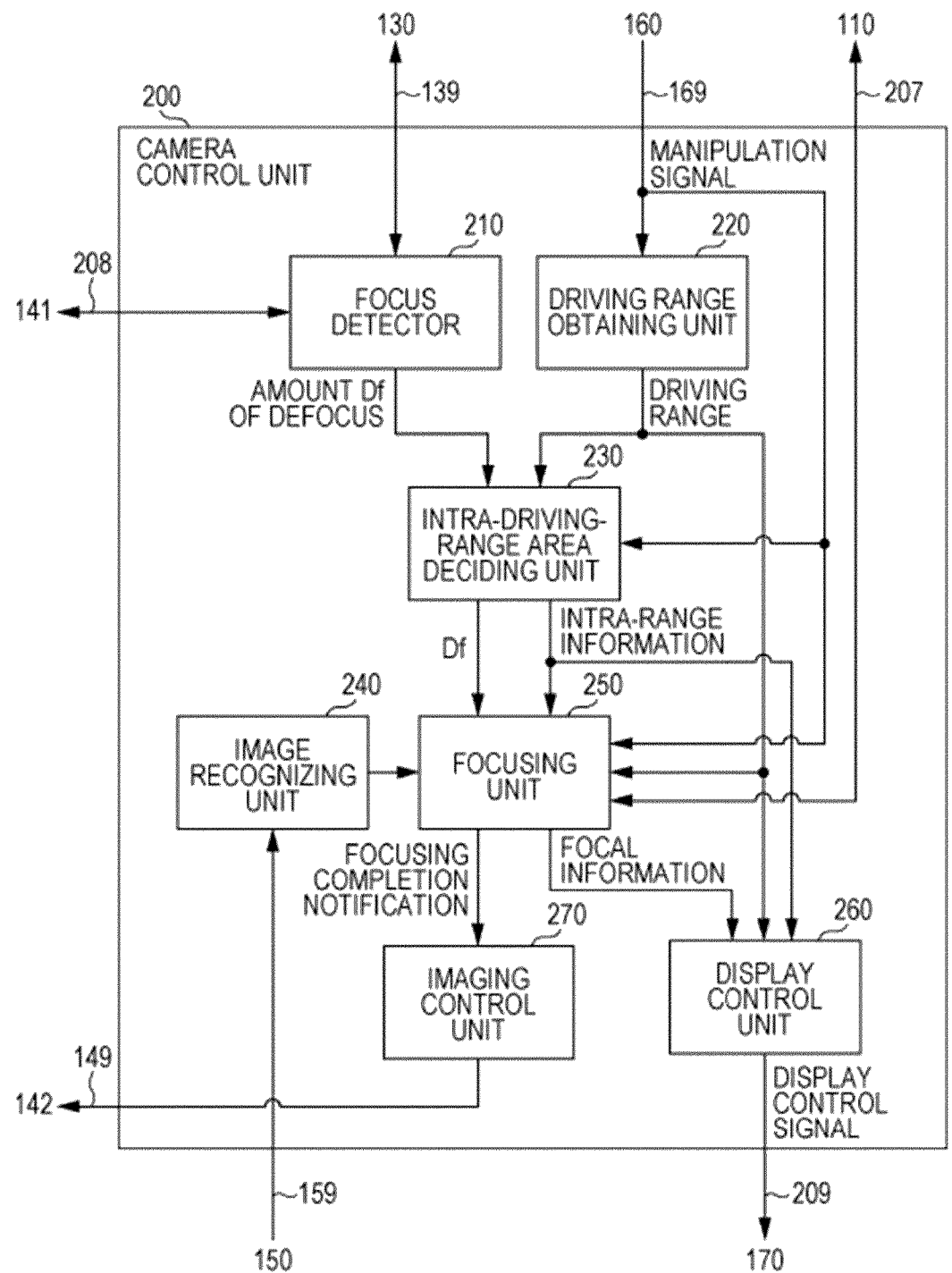

[Fig. 18]
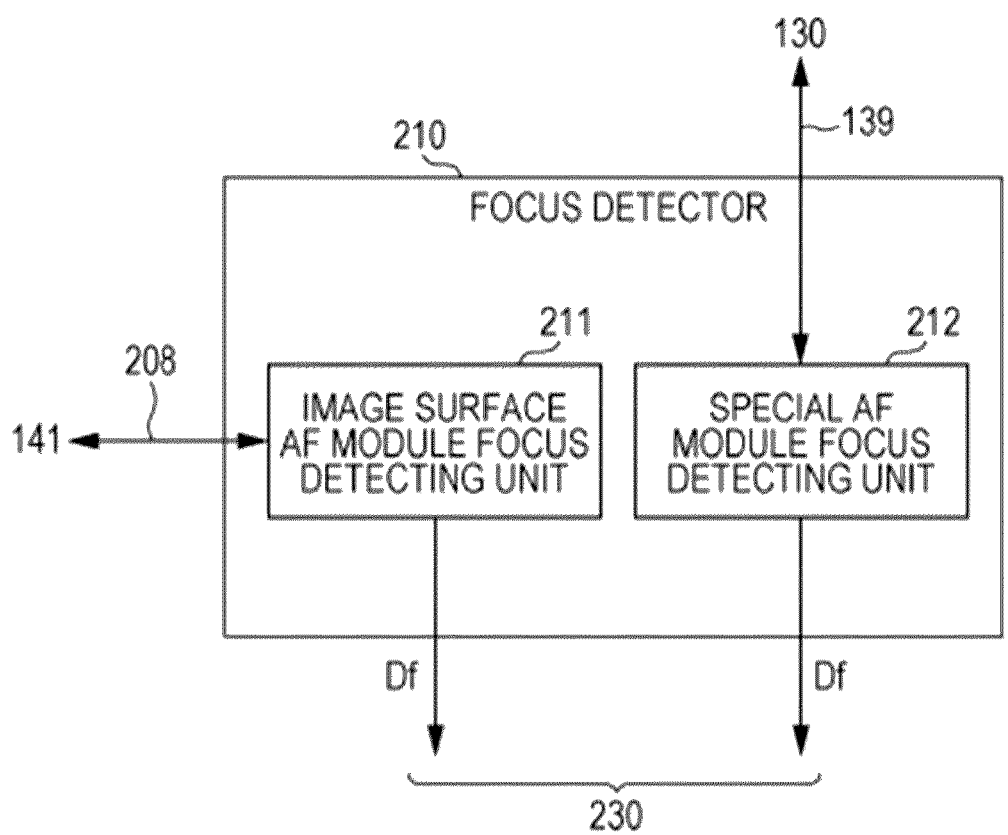

[Fig. 19]
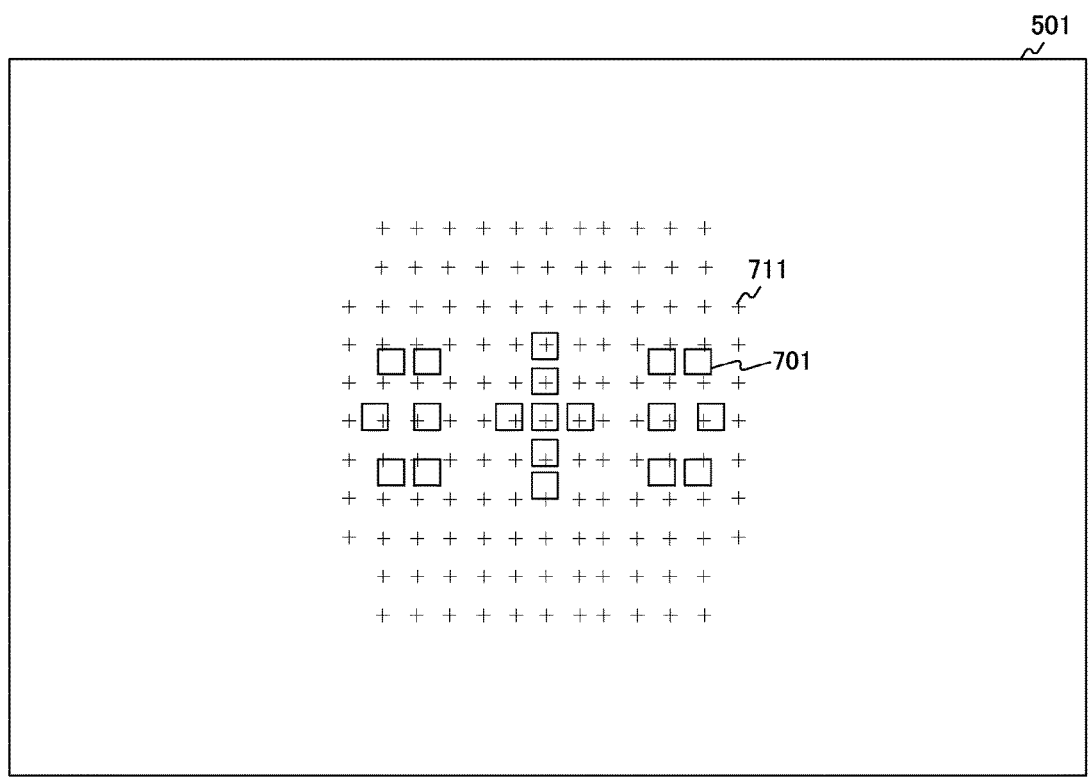

[Fig. 20]
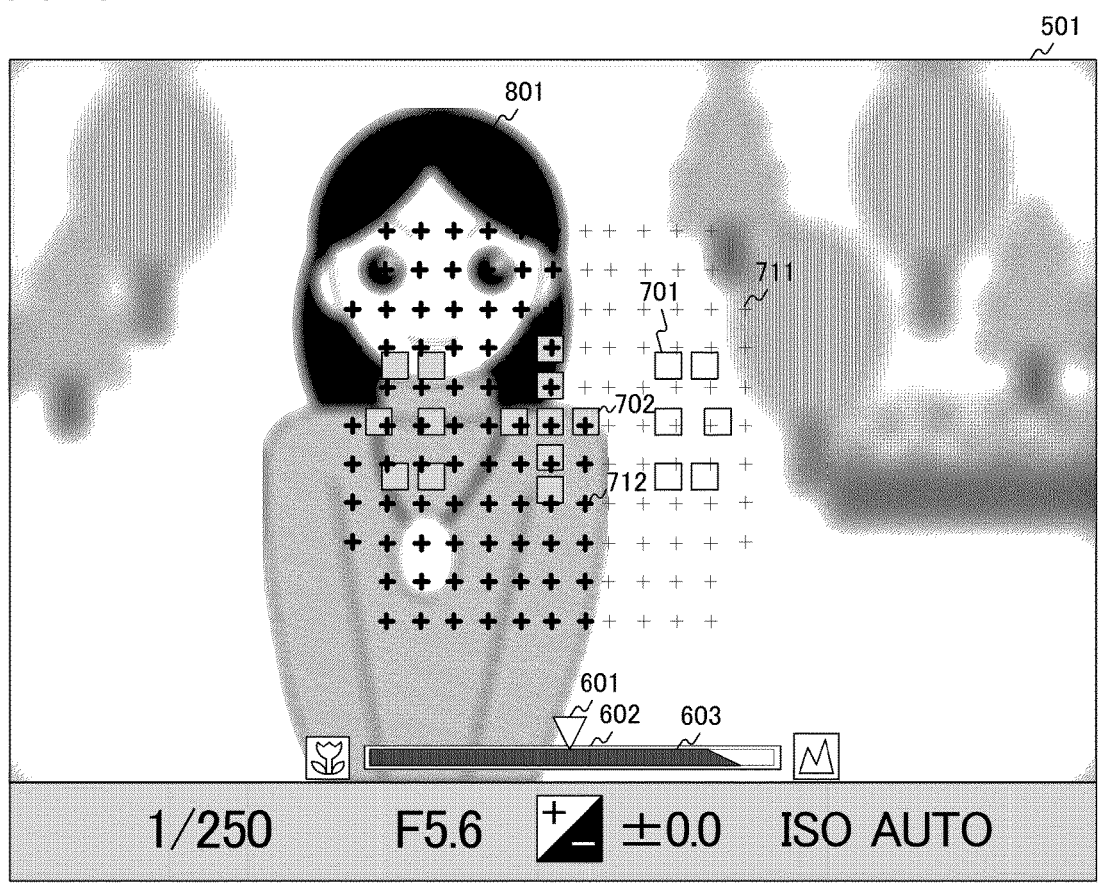

[Fig. 21]
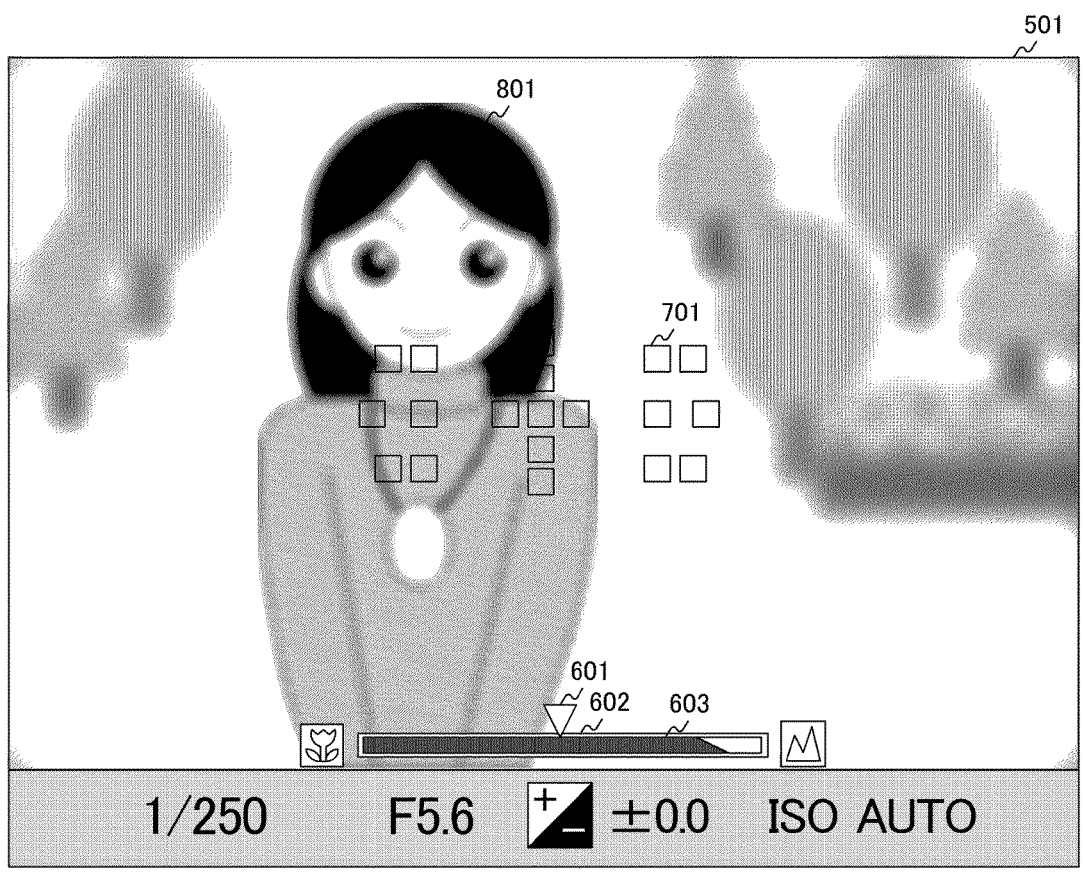

[Fig. 22]
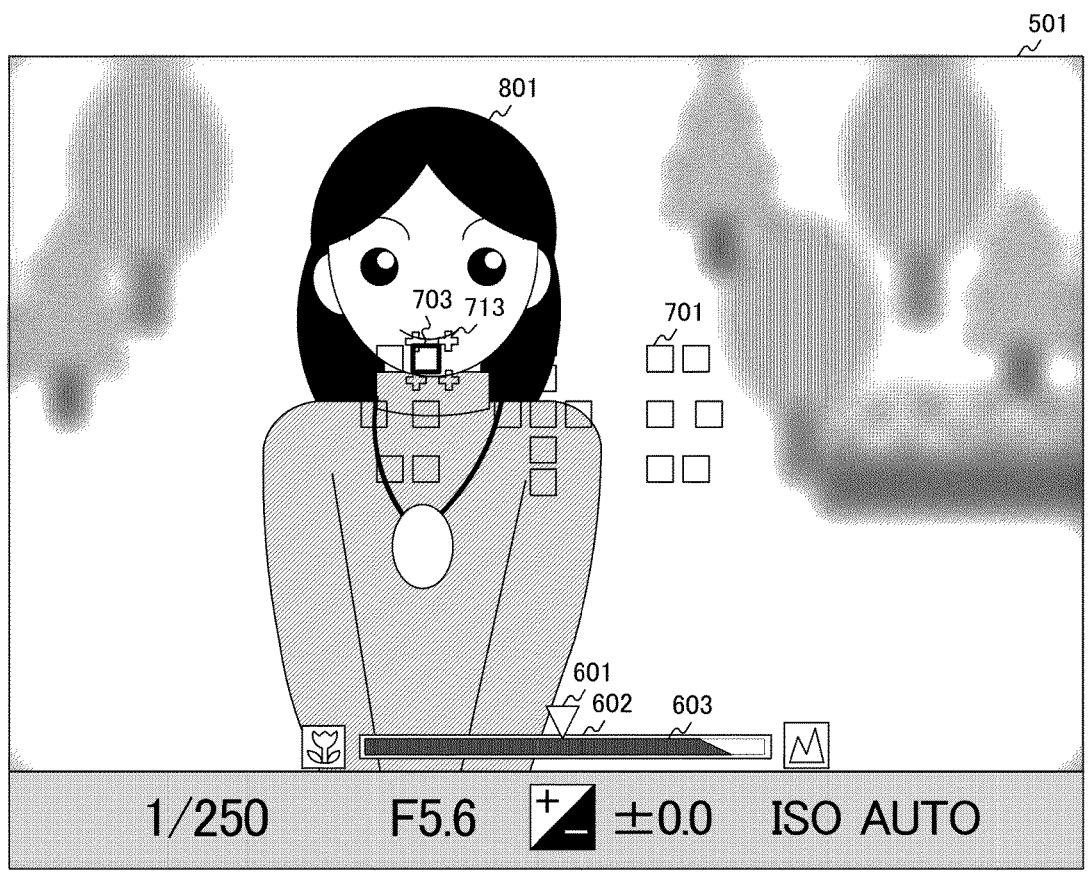

[Fig. 23]
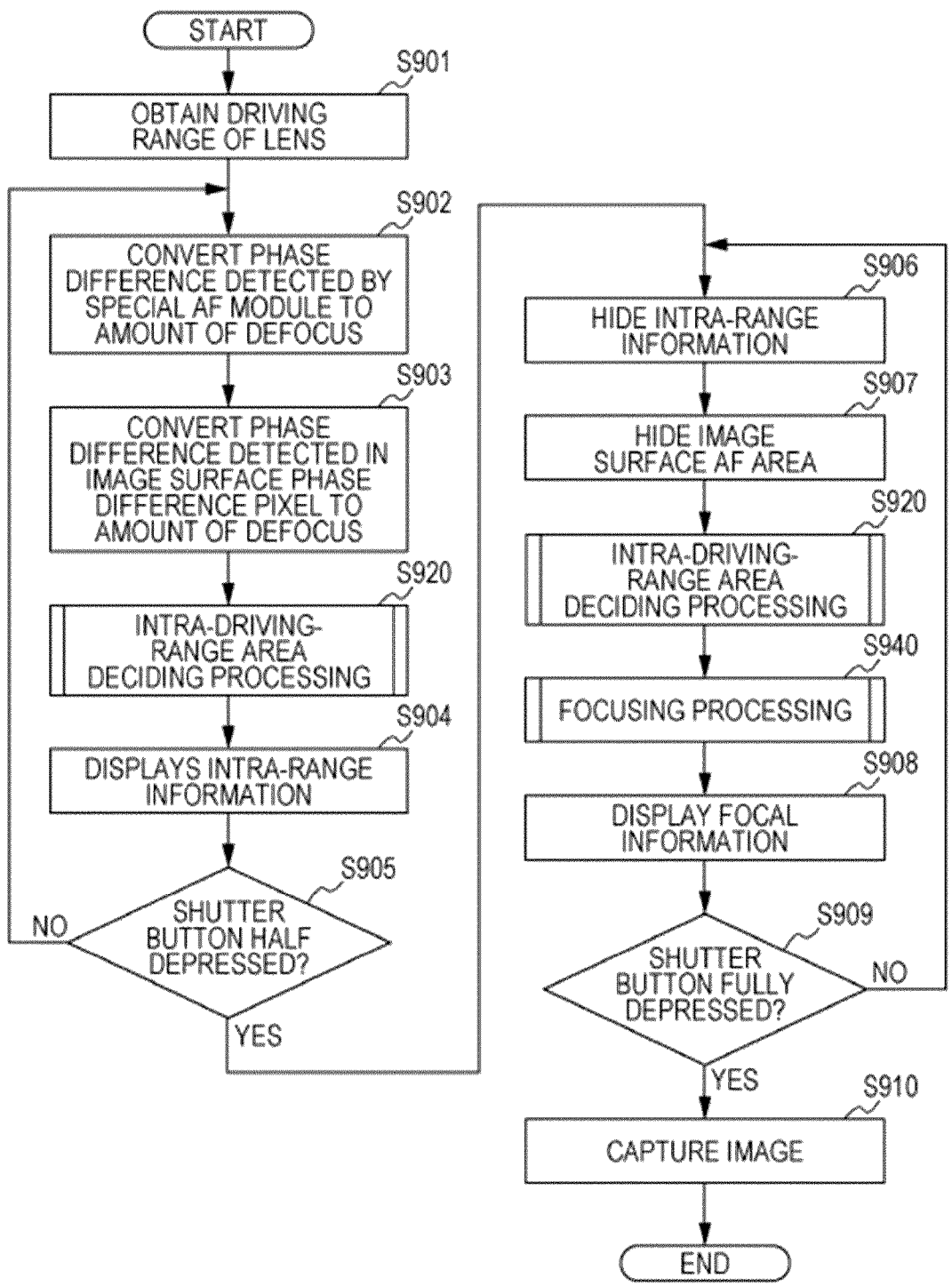

[Fig. 24]
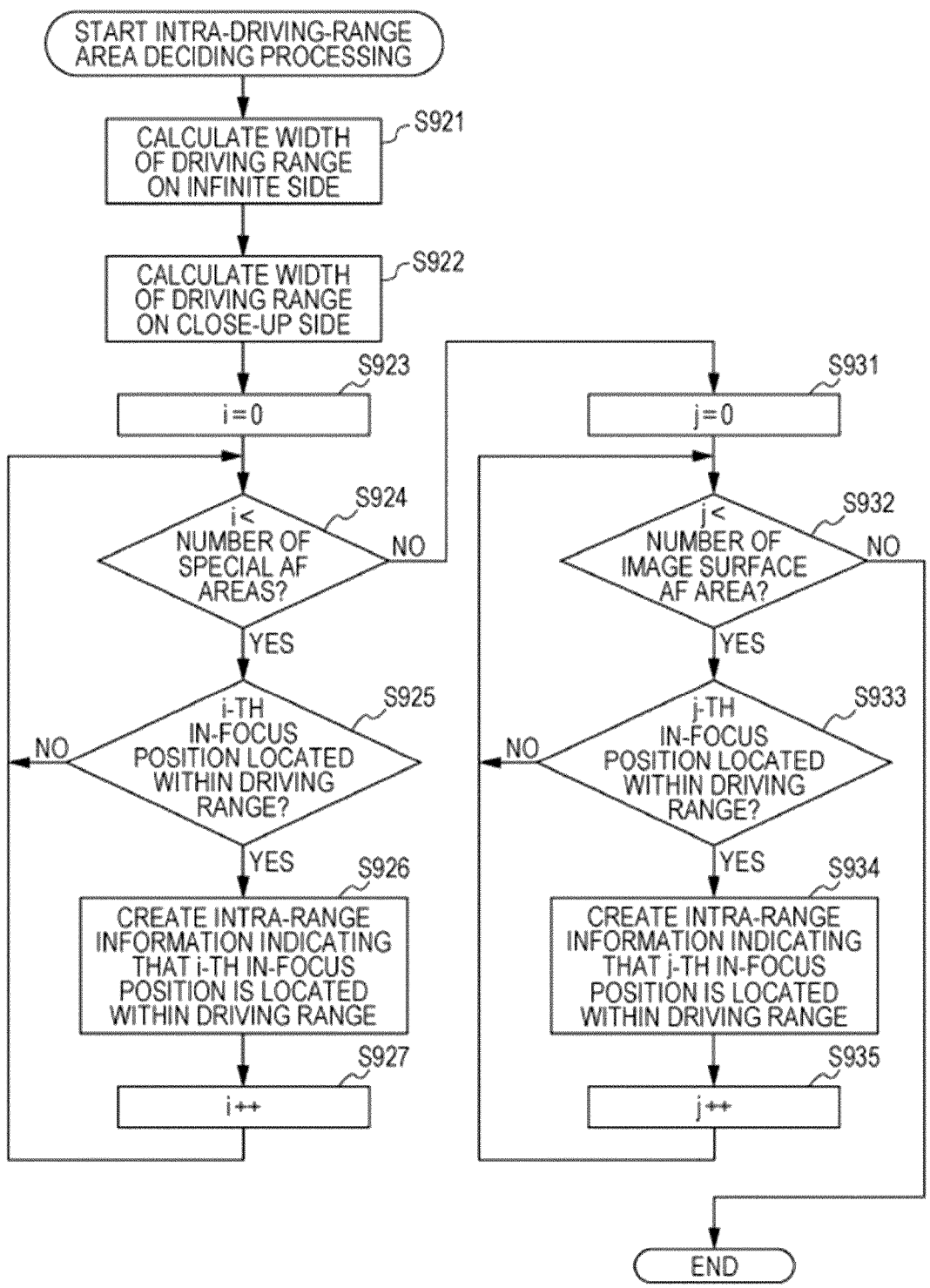

[Fig. 25]
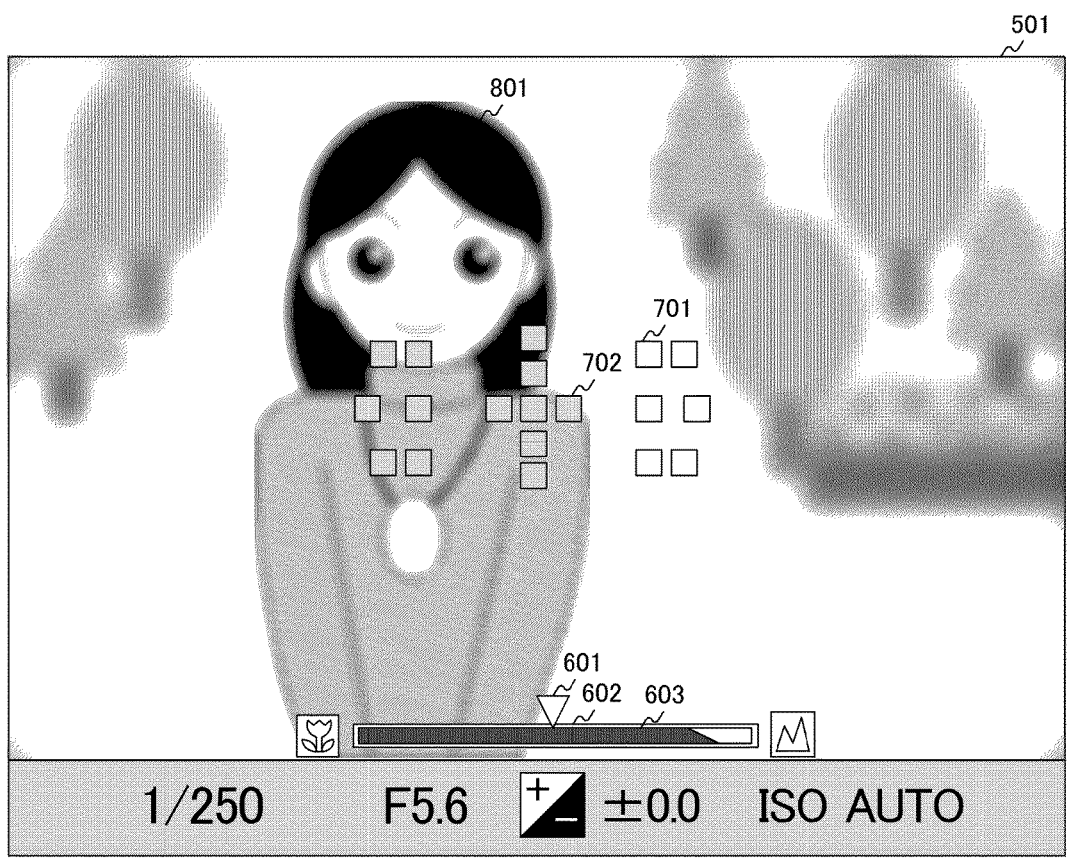

[Fig. 26]
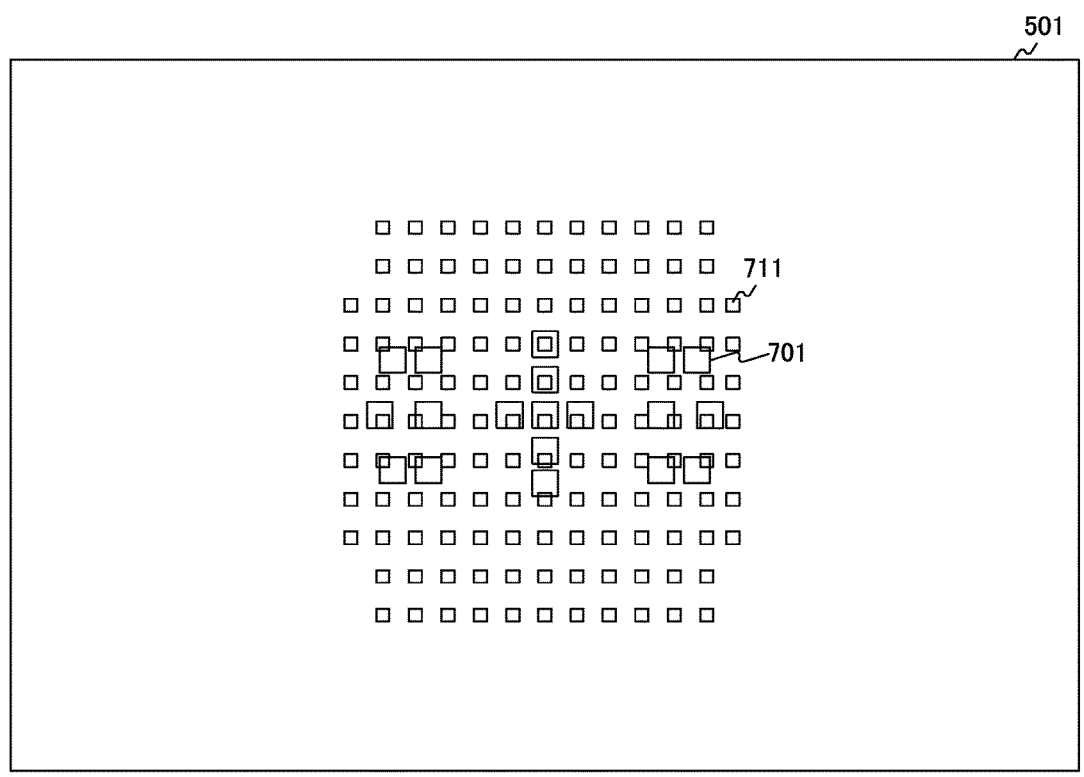

INFORMATION PROCESSING TO INDICATE FOCUSABLE AREAS IN AN IMAGE

TECHNICAL FIELD

The present technology relates to an imaging control apparatus, an imaging apparatus, and an imaging control method, and more particularly to an imaging control apparatus and an imaging apparatus that have an auto focus (AF) function as well as an imaging control method.

BACKGROUND ART

Many imaging apparatuses in the related art have a so-called AF function, by which a focus is automatically obtained. The imaging apparatus implements this AF function by detecting an amount of defocus, which indicates an amount by which a correct focus deviates, in each of a plurality of AF areas and driving a focus lens to an in-focus position according to the detected amount of defocus. If the amount of defocus is large, a time taken until the driving of the focus lens is completed, that is, a release time lag, is prolonged. To shorten the release time lag, an imaging apparatus that limits a range in which the focus lens is driven is proposed (see PTL 1, for example).

CITATION LIST

Patent Literature

PTL 1: Japanese Unexamined Patent Application Publication No. 2005-202064

SUMMARY

Technical Problem

However, the above technology in the related art may make it difficult to use the AF function in imaging. If the in-focus position of the focus lens is outside the driving range, it becomes hard to obtain a focus in an AF area. In spite of this, the above imaging apparatus does not display the driving range in, for example, a finder. Therefore, the user is unable to decide whether the AF area is a focusable area, in which a focus is obtained, so it may become difficult for the user to use the AF function in imaging. If, for example, the user is unable to decide whether the AF area is a focusable area, the user may capture a subject image overlaid on the AF area in which a focus is hard to obtain. In this case, a risk of having to capture an image with a different composition may arise.

It is desirable to facilitate imaging in which the AF function is used.

Solution to Problem

According to an embodiment of the present technology, there are provided an information processing system and method. A first mode of the present technology is the imaging control apparatus and the method of controlling the imaging control apparatus. The imaging control apparatus includes: a driving range obtaining unit that obtains the driving range of a lens; a detector that detects a distance between the current position of the lens and the in-focus position of the lens for each of a plurality of detection areas in an image formed by the lens; an intra-driving-range area deciding unit that decides whether the in-focus position is located within the driving range in each of the plurality of detection areas, according to the detected distance and the current position; and a display control unit that causes a display unit to display intra-range information in each of the plurality of detection areas, the intra-range information indicating whether the in-focus position is located within the driving range. Thus, an effect is obtained in that intra-range information indicating whether an in-focus position is located within a driving range is displayed in each of a plurality of detection areas.

In this first mode, the display control unit may also cause the display unit to display the intra-range information in each of the plurality of detection areas during a period from when a decision has been made as to whether the in-focus position is located within the driving range until a focusing operation starts. Thus, an effect is obtained in that intra-range information is displayed in each of the plurality of detection areas during a period from when a decision has been made as to whether the in-focus position is located within the driving range until a focusing operation starts.

In this first mode, the display control unit may also cause the display unit to display the intra-range information in each of the plurality of detection areas during a period from when a decision has been made as to whether the in-focus position is located within the driving range until the image formed by the lens is captured. Thus, an effect is obtained in that intra-range information is displayed for each of the plurality of detection areas during a period from when a decision has been made as to whether the in-focus position is located within the driving range until an image formed by a lens is captured.

In this first mode, the plurality of detection areas may also include a plurality of main detection areas and more sub-detection areas than the number of the plurality of main detection areas; the display control unit may cause the display unit to display the intra-range information in each of the plurality of main detection areas and in each of the plurality of sub-detection areas during a period from when a decision has been made as to whether the in-focus position is located within the driving range until a focusing operation starts and may cause the display unit to display the plurality of main detection areas during a period from when the focusing operation starts until the image formed by the lens is captured. Thus, an effect is obtained in that the intra-range information is displayed in each of a plurality of main detection areas and in each of a plurality of sub-detection areas during a period from when a decision has been made as to whether the in-focus position is located within the driving range until a focusing operation starts and that the plurality of main detection areas are displayed during a period from when the focusing operation starts until an image is captured.

In this first mode, the display control unit may also cause the display unit to display the plurality of sub-detection areas having a different size from the plurality of main detection areas. Thus, an effect is obtained in that the plurality of sub-detections areas having a different size from the plurality of main detection areas are displayed.

In this first mode, if the driving range of the lens has been changed from its initial range, the display control unit may obtain the driving range after the change; the display control unit may cause the display unit to display an area indicating the obtained driving range and an area indicating the initial range. Thus, an effect is obtained in that an area indicating an obtained driving range and an area indicating an initial range are displayed.

In this first mode, the intra-driving-range area deciding unit may also decide whether the in-focus position is located within the driving range, depending on whether the distance between the current position and the start position or end position of the driving range is longer than or equal to the detected distance. Thus, an effect is obtained in that whether the in-focus position is located within the driving range is decided depending on whether the distance between the current position and a start position or an end position of the driving range is longer than or equal to the detected distance.

In this first mode, the display control unit may also cause the display unit to display a particular color indicating that the in-focus position is located within the driving range, as the intra-range information. Thus, an effect is obtained in that a particular color indicating that the in-focus position is located within the driving range is displayed as the intra-range information.

In this first mode, the imaging control apparatus may further include a focusing unit that performs a focusing operation in which the lens is driven to the in-focus position according to the distance detected in a detection area, which is one of the plurality of detection areas, in which the in-focus position has been decided to be within the driving range, and the display control unit may also cause the display unit to display focal information indicating whether a focus has been obtained in each of the plurality of detection areas. Thus, an effect is obtained in that focal information indicating whether a focus has been obtained in each of the plurality of detection areas is displayed.

A second mode of the present technology is the imaging apparatus that includes: a driving range obtaining unit that obtains a driving range of a lens; a detector that detects a distance between the current position of the lens and the in-focus position of the lens for each of a plurality of detection areas in an image formed by the lens; an intra-driving-range area deciding unit that decides whether the in-focus position is located within the driving range in each of the plurality of detection areas, according to the detected distance and the current position; a display control unit that causes a display unit to display intra-range information in each of the plurality of detection areas, the intra-range information indicating whether the in-focus position is located within the driving range; and an imaging unit that captures an image formed by the lens. Thus, an effect is obtained in that the intra-range information indicating whether the in-focus position is located within the driving range is displayed in each of the plurality of detection areas.

Advantageous Effects of Invention

The present technology provides the superior effect that imaging in which the AF function is used is facilitated.

BRIEF DESCRIPTION OF DRAWINGS

FIG. 1 illustrates an example of a cross sectional view of an imaging apparatus in a first embodiment.
FIG. 2 is a block diagram illustrating an example of the structure of the imaging apparatus in the first embodiment.
FIG. 3 is a block diagram illustrating an example of the structure of a camera control unit in the first embodiment.
FIG. 4 is a block diagram illustrating an example of the structure of an intra-driving-range area deciding unit in the first embodiment.
FIG. 5 illustrates an example of data retained in a defocus buffer in the first embodiment.
FIG. 6 is a block diagram illustrating an example of the structure of a focusing unit in the first embodiment.
FIG. 7 illustrates an example of a bar displayed in a driving range in the first embodiment.
FIG. 8 illustrates an example of the layout of AF areas in the first embodiment.
FIG. 9 illustrates an example of a screen displayed before a focusing operation is performed in a case in which there is no an intra-driving-range area in the first embodiment.
FIG. 10 illustrates an example of a screen displayed before a focusing operation is performed in a case in which there are intra-driving-range areas in the first embodiment.
FIG. 11 illustrates an example of a screen displayed after a focus has been obtained in the first embodiment.
FIG. 12 is a flowchart illustrating an example of operation of the imaging apparatus in the first embodiment.
FIG. 13 is a flowchart illustrating an example of intra-driving-range area deciding processing in the first embodiment.
FIG. 14 is a flowchart illustrating an example of focusing processing in the first embodiment.
FIG. 15 illustrates an example of a screen displayed after a focus has been obtained in a variation of the first embodiment.
FIG. 16 is a block diagram illustrating an example of the structure of an imaging apparatus in a second embodiment.
FIG. 17 is a block diagram illustrating an example of the structure of a camera control unit in the second embodiment.
FIG. 18 is a block diagram illustrating an example of the structure of a focus detecting unit in the second embodiment.
FIG. 19 illustrates an example of the of AF areas in the second embodiment.
FIG. 20 illustrates an example of a screen displayed before a focusing operation is performed in a case in which there are intra-driving-range areas in the second embodiment.
FIG. 21 illustrates an example of a screen displayed immediately after a focusing operation has been started in the second embodiment.
FIG. 22 illustrates an example of a screen displayed after a focus has been obtained in the second embodiment.
FIG. 23 is a flowchart illustrating an example of an operation of the imaging apparatus in the second embodiment.
FIG. 24 is a flowchart illustrating an example of intra-driving-range area deciding processing in the second embodiment.
FIG. 25 illustrates an example of a screen displayed immediately after focusing has been started in a variation of the second embodiment.
FIG. 26 illustrates an example of the layout of AF areas in a variation of the second embodiment.

DESCRIPTION OF EMBODIMENTS

Forms to embody the present technology (referred to below as embodiments) will be described below in the following order.
1. First embodiment (example of displaying intra-range information in each of special AF areas)
2. Second embodiment (example of displaying intra-range information in each of special AF areas and image surface AF areas)

First Embodiment

Example of the Structure of an Imaging Apparatus

FIG. 1 illustrates an example of a cross sectional view of an imaging apparatus 100 in a first embodiment. The imaging apparatus 100 includes an imaging lens 110, a fixed half mirror 120, a special AF module 130, an imaging device 140, a shutter button 161, a focus limiter switch 162, a cross-key 163, and a display unit 170.

The imaging lens 110 can adjust a focus. For example, a zoom lens having a plurality of lens elements such as, for example, a focus lens is used as the imaging lens 110. A focus is adjusted by controlling the position of the focus lens. Although the imaging lens 110 is formed with a plurality of lens elements, all of these lens elements are indicated as a single imaging lens 110 in FIG. 1.

The fixed half mirror 120 is a semi-transmissive mirror; part of light directed from the imaging lens 110 transmits through the fixed half mirror 120 and enters the imaging device 140. The fixed half mirror 120 reflects part of the remainder so that the reflected light enters the special AF module 130.

The special AF module 130 detects the difference in phase between two images obtained as a result of pupil division performed by using a separator lens or the like. The special AF module 130 calculates the degrees of correlations between the two images resulting from pupil division in a case in which one of the two images is shifted with respect to the other image by amounts equal to various amounts of image deviations. The special AF module 130 detects the amount of image deviation corresponding to the highest degree of correlation as the phase difference.

The imaging device 140 receives light through the imaging lens 110 and fixed half mirror 120, converts the amount of the received light to an electric potential, and output the converted electric potential as a pixel value. The imaging device 140 is an example of an imaging unit described in CLAIMS.

The shutter button 161 is manipulated to start a focusing operation and imaging. The shutter button 161 is, for example, a two-stage button; when shutter button 161 is half depressed, a focusing operation is started, after which when the shutter button 161 is fully depressed, imaging is started.

A focusing operation and imaging may be started under conditions other than the half depressing and full depressing of the shutter button 161. For example, an AF button may be provided besides the shutter button 161. When the AF button is manipulated, a focusing operation may be started. Alternatively, when the shutter button 161 is fully depressed, a focusing operation may be started, and immediately after the completion of the focusing operation, imaging may be started. Alternatively, after a time set in a self-timer has elapsed, a focusing operation and imaging may be started.

The focus limiter switch 162 is manipulated to change the driving range of the focus lens. The cross-key 163 is used for various purposes. For example, the cross-key 163 is manipulated to change the driving range of the focus lens. Although, in FIG. 1, the focus limiter switch 162 is mounted on the lens-barrel of the imaging apparatus 100, the focus limiter switch 162 may be mounted on the main body of the imaging apparatus 100.

The display unit 170 displays an image formed by the imaging device 140. The display unit 170, which has, for example, an electronic view finder (EVF), displays special AF areas besides an image. The special AF module 130 detects a focus in one of these special AF areas in an image formed by the focus lens.

FIG. 2 is a block diagram illustrating an example of the structure of the imaging apparatus 100 in the first embodiment. As described above, the imaging apparatus 100 includes the imaging lens 110, fixed half mirror 120, special AF module 130, imaging device 140, and display unit 170.

In addition, the imaging apparatus 100 includes an image processing unit 150, a manipulation unit 160, an image recording unit 180, and a camera control unit 200.

The imaging lens 110, fixed half mirror 120, special AF module 130, imaging device 140, and display unit 170 in FIG. 2 have the same structure as illustrated in FIG. 1.

The image processing unit 150 executes de-mosaic processing, white balance processing, and other image processing on image data created from pixel values obtained from the imaging device 140. The image processing unit 150 receives a pixel value from the imaging device 140 through a signal line 149 and retains the pixel value as image data. The image processing unit 150 executes de-mosaic processing, white balance processing, and other image processing on the image data on a demand basis and outputs the processed image data to the display unit 170, image recording unit 180, and camera control unit 200 through a signal line 159.

The manipulation unit 160, which has the shutter button 161, the focus limiter switch 162, the cross-key 163 and the like, generates manipulation signals in response to user's manipulation on these switches. The manipulation unit 160 sends these manipulation signals to the camera control unit 200 through a signal line 169.

The camera control unit 200 controls the whole of the imaging apparatus 100. The camera control unit 200 obtains, as a driving range, a range in which the focus lens can be driven from manipulation signals generated when the focus limiter switch 162 or cross-key 163 is manipulated. The camera control unit 200 controls the display unit 170 through a signal line 209 so that a bar with a length appropriate for the driving range is displayed in a live view image. The live view image is an image formed from data output from the imaging device 140 in real time.

The camera control unit 200 receives a phase difference from the special AF module 130 through a signal line 139, and decides whether the in-focus position of the focus lens is located within the driving range according to the phase difference and the current position of the focus lens. The in-focus position is the position of the focus lens at which a focus is obtained. After making a decision as to whether the in-focus position of the focus lens is located within the driving range, the camera control unit 200 causes the display unit 170 to display intra-range information in each special AF area, the intra-range information indicating whether the in-focus position is located within the driving range. For example, the camera control unit 200 causes the display unit 170 to display a particular color as the intra-range information in a special AF area to indicate that the in-focus position in the special AF area is located within the driving range.

When the shutter button 161 is half depressed or another manipulation is carried out to start a focusing operation, the camera control unit 200 selects an area in which to obtain a focus (the area will be referred to below as the to-be-focused area) from special AF areas where the in-focus position is located within the driving range. For example, the camera control unit 200 recognizes a face in the live view image and selects, from special AF areas where the in-focus position is located within the driving range, an area overlaid on the face as the to-be-focused area. In the selected special AF area, the camera control unit 200 obtains a focus by moving the focus lens to the in-focus position. The camera control unit 200 causes the display unit 170 to display focal information indicating whether a focusing operation has been completed, in each special AF area. For example, the camera control unit 200 causes the display unit 170 to display, as the focal information, a frame in a particular color that indicates that a focusing operation has been completed in the special AF area.

Although the camera control unit 200 causes the display unit 170 to display a particular color as the intra-range information and focal information, information other than a color may be displayed. For example, the camera control unit 200 may cause the display unit 170 to display a blinking frame as the intra-range information and focal information.

Upon completion of obtaining a focus, when the shutter button 161 is fully depressed or another manipulation is carried out to start imaging, the camera control unit 200 causes the imaging device 140 to obtain image data to be recorded and causes the image recording unit 180 to record the obtained image data.

The camera control unit 200 is an example of an imaging control unit described in CLAIMS.

Example of the Structure of the Camera Control Unit

FIG. 3 is a block diagram illustrating an example of the structure of the camera control unit 200 in the first embodiment. The camera control unit 200 includes a focus detector 210, a driving range obtaining unit 220, an intra-driving-range area deciding unit 230, an image recognizing unit 240, a focusing unit 250, a display control unit 260, and an imaging control unit 270.

The focus detector 210 receives a phase difference from the special AF module 130 and detects an amount Df of defocus from the received phase difference. The amount Df of defocus, which is a distance between the current position of the focus lens and the in-focus position, is obtained from the phase difference by, for example, using equation (1) below. The focus detector 210 sends the obtained amount Df of defocus to the intra-driving-range area deciding unit 230. The unit of the amount Df of defocus is, for example, millimeters.

[Math.1]

$$Df = S \times t - s \quad (1)$$

where S is the phase difference, t is a conversion coefficient used to convert the phase difference to the amount of defocus, s is a pitch, which is obtained by converting a distance between a pair of photosensitive devices in the special AF module 130 in a defocus direction.

The sign of the amount Df of defocus indicates whether the direction from the current position of the focus lens toward the in-focus position is a close-up direction or an infinite direction. Whether the close-up direction and infinite direction are represented by a positive sign or a negative sine depends on which one of the pair of photosensitive devices has been used as a reference during the detection of the phase difference.

The focus detector 210 is an example of a detector described in CLAIMS.

The driving range obtaining unit 220 obtains a driving range from a manipulation signal generated when the focus limiter switch 162 or cross-key 163 is manipulated. Specifically, the driving range is a range from a start position on the close-up side to an end position on the infinite side. If the driving range has been changed with the focus limiter switch 162 or the like, the driving range after the change is obtained. The driving range obtaining unit 220 sends the obtained driving range to the intra-driving-range area deciding unit 230 and display control unit 260.

The intra-driving-range area deciding unit 230 decides, for each special AF area, whether the in-focus position is located within the driving range according to the amount of defocus and the current position of the focus lens. Processing to decide whether the in-focus position is located within the driving range is executed, for example, each time a live view image is obtained, until a focusing operation is started.

Depending on whether equation (2) below holds, the intra-driving-range area deciding unit 230 decides, for each special AF area, whether the in-focus position is located within the driving range. An area for which the in-focus position is decided to be within the driving range is an area in which a focus can be obtained by driving the focus lens to the in-focus position. This area will be referred to as the intra-driving-range area.

[Math.2]

$$|Df| \leq |Z_P - Z_E| \quad (2)$$

where $Z_P$ is the current position of the focus lens. When, for example, the current position is measured by using a photo interrupter or another positional sensor, the number of pulses is used as the unit of the current position. $Z_E$ is the start position or the end position in the driving range of the focus lens, whichever is in the same direction as the direction toward the in-focus position. The unit of $Z_E$ is the same as the unit of values measured by the positional sensor (the number of pulses, for example). L is a coefficient used to convert the unit of values measured by the positional sensor to the unit of the amount Df of defocus.

Although the intra-driving-range area deciding unit 230 converts the units of the phase difference and values measured by the positional sensor to the unit of the amount Df of defocus, the intra-driving-range area deciding unit 230 may convert the unit of values measured by the positional sensor to the unit of the phase difference and may decide whether the in-focus position is located within the driving range. Alternatively, the intra-driving-range area deciding unit 230 may convert the unit of the phase difference to the unit of values measured by a positional sensor and may decide whether the in-focus position is located within the driving range.

Although the value of the conversion coefficient L is the same regardless of whether $Z_E$ is in the close-up direction or the infinite direction, a conversion coefficient the value of which changes depending on whether $Z_E$ is in the close-up direction or the infinite direction may be used.

The intra-driving-range area deciding unit 230 creates, for each special AF area, intra-range information indicating whether the in-focus position is located within the driving range, and sends the created intra-range information to the focusing unit 250 and display control unit 260. The intra-driving-range area deciding unit 230 sends the amount Df of defocus for each special AF area to the focusing unit 250. The intra-driving-range area deciding unit 230 is an example of an intra-driving-range area deciding unit described in CLAIMS.

The image recognizing unit 240 recognizes a predetermined object in a live view image. For example, the image recognizing unit 240 references a database in which numerical face image data of various persons and numerical data of features of face parts are stored, and recognizes a face in an image. The image recognizing unit 240 sends a recognition result to the focusing unit 250.

The focusing unit 250 selects a to-be-focused area from AF-ready areas, in which AF is possible, and obtains a focus in that area. For example, the focusing unit 250 selects an AF-ready area overlaid on an object recognized by the image recognizing unit 240 as the to-be-focused area. Alternatively, the focusing unit 250 selects the area that is closest to the center of the live view image as the to-be-focused area. The focusing unit 250 receives the amount Df of defocus of the selected area from the intra-driving-range area deciding unit 230, and obtains a focus by driving the focus lens to the in-focus position according to the received amount Df of defocus. Upon completion of obtaining the focus, the focusing unit 250 sends focal information indicating whether a focusing operation has been completed to the display control unit 260 for each special AF area, and also sends a focusing completion notification, which indicates a focusing operation has been completed, to the imaging control unit 270.

Although the focusing unit 250 selects a to-be-focused area according to the result of face recognition or from the position of an area in the in-driving range, a to-be-focused area may be selected by another method. For example, the focusing unit 250 may obtain a statistical amount (such as the average or minimum value) of the amount of defocus Df detected in individual areas to be subject to AF and may select an area in which the amount Df of defocus closest to the statistical amount has been detected as the to-be-focused area.

The display control unit 260 controls the display unit 170 so that the display unit 170 displays the special AF areas, a driving range, intra-range information, and focal information in the live view. The display control unit 260 displays, for example, a rectangular mark as a special AF area. The display control unit 260 also causes the display unit 170 to display a bar with a length appropriate for the driving range.

During a period from when the intra-range information has been created until an in-focusing operation starts, the display control unit 260 causes the display unit 170 to display a particular color that indicates that the in-focus position of the special AF area is located within the driving range as the intra-range information, the color being displayed in that area.

When an in-focusing operation starts, the display control unit 260 hides the intra-range information. Upon completion of the in-focusing operation, the display control unit 260 causes the display unit 170 to display a particular color that indicates that the area is a focused area, in the area in which the in-focusing operation has been completed.

When the imaging control unit 270 receives the focusing completion notification and a manipulation to start imaging is carried out, the imaging control unit 270 controls the imaging device 140 to obtain image data to be recorded.

Example of the Structure of the
Intra-Driving-Range Area Deciding Unit

FIG. 4 is a block diagram illustrating an example of the structure of the intra-driving-range area deciding unit 230 in the first embodiment. The intra-driving-range area deciding unit 230 includes an intra-driving-range area deciding circuit 231 and a defocus buffer 232.

The intra-driving-range area deciding circuit 231 uses equation (2) described above to decide for each special AF area whether the in-focus position is located within the driving range. The intra-driving-range area deciding circuit 231 creates intra-range information indicating a decision result, and stores the created intra-range information in the defocus buffer 232.

The defocus buffer 232 retains an amount of defocus and intra-range information for each special AF area.

FIG. 5 illustrates an example of data retained in the defocus buffer 232. In FIG. 5, #A (A is an integer greater than or equal to 1) is identification information that identifies a special AF area. The defocus buffer 232 is allocated an area used to retain an amount of defocus and intra-range information for each special AF area. For example, if the in-focus position is located within the intra-range information, 1 is set as the intra-range information; otherwise, 0 is set. In an initial state, 0 is set as the intra-range information. If, for example, a defocus amount of +10 is detected in special AF area #1 and the in-focus position is located within the driving range in that area, +10 and 1 are respectively retained as the amount of defocus and the intra-range information, in correspondence to special AF area #1.

Example of the Structure of the Focusing Unit

FIG. 6 is a block diagram illustrating an example of the structure of the focusing unit 250 in the first embodiment. The focusing unit 250 includes, for example, a to-be-focused area selecting unit 251 and a focus lens control unit 252.

When a focusing operation is started by, for example, manipulating the shutter button 161, the to-be-focused area selecting unit 251 selects a to-be-focused area from the areas in the driving range according to, for example, an image recognition result. The to-be-focused area selecting unit 251 sends, to the focus lens control unit 252, identification information that identifies the selected to-be-focused area.

The focus lens control unit 252 obtains the amount Df of defocus detected in the to-be-focused area from the intra-driving-range area deciding circuit 231, and drives the focus lens to the in-focus position according to the amount Df of defocus. The focus lens control unit 252 sends a control signal used to drive the focus lens, after which the focus lens control unit 252 obtains the current position of the focus lens and decides whether the focus lens has been driven to the in-focus position. If the focus lens control unit 252 decides that the focus lens has been driven to the in-focus position, the focus lens control unit 252 sends a focusing completion notification to the imaging control unit 270 and also sends focal information to the display control unit 260.

FIG. 7 illustrates an example of a bar displayed in the driving range in the first embodiment. The Z axis in FIG. 7 is an axis parallel to the optical axis of the focus lens. On the Z axis, $Z_P$ is the current position of the focus lens and $Z_F$ is the in-focus position of the focus lens. $Z_{NI}$ is the initial position of the extreme end position in the close-up direction (start position) in the driving range as viewed from the current position $Z_P$, and $Z_{FI}$ is the initial position of the extreme end position in the infinite direction (end position) as viewed from the current position $Z_P$. $Z_{NE}$ is the current initial position and $Z_{FE}$ is the current end position. The range from the start position ($Z_{NI}$ or $Z_{NE}$) to the end position ($Z_{FI}$ or $Z_{FE}$) is the driving range of the focus lens. In the initial state, in which the driving range of the focus lens has not been changed, the initial range from the start position $Z_{NI}$ to the end position $Z_{FI}$ is obtained as the driving range of the focus lens. If the driving range of the focus lens is changed from the initial range due to, for example, a manipulation of the focus limiter switch 162, the driving range after the change (a range from $Z_{NI}$ to $Z_{FE}$, for example) is obtained. In the driving range, the extreme end position in the close-up direction and the extreme end position in the infinite direction as viewed from the current position may be respectively handled as the start position and the end position.

The range from the current position $Z_P$ to the start position $Z_{NE}$ will be referred to below as the driving range on the close-up side, and the range from the current position $Z_P$ to the end position $Z_{FE}$ will be referred to below as the driving range on the infinite side. The distance from the current position $Z_P$ to the in-focus position $Z_F$ is equivalent to the amount Df of defocus.

If the length of the driving range on either side, the close-up side or the infinite side, on which the in-focus position $Z_F$ is present is at least the amount Df of defocus, the in-focus position $Z_F$ is present in that driving range. The imaging apparatus 100 decides that a focus can be obtained in the special AF area in which the in-focus position $Z_F$ is present in the driving range. The side, the close-up side or the infinite side, on which the in-focus position is present in the driving range is decided from the sign of the amount of defocus.

In a live view image, an area indicating a driving range from the start position $Z_{NE}$ to the end position $Z_{FE}$ is displayed. For example, a bar 603 with a length proportional to the length of the driving range is displayed. A current position indicator 601, which is triangular, is displayed on the bar 603 at a position corresponding to the current position $Z_P$. An area indicating the initial range of the driving range is also displayed. For example, a bar 602 with a length proportional to the length of the initial range is displayed. There is no limitation to the shapes of the bar 602, bar 603, and current position indicator 601.

When the initial driving range and the current driving range are respectively displayed as the bar 602 and bar 603 as described above, the user can visually recognize the change of the current driving range from the initial driving range.

FIG. 8 illustrates an example of the layout of AF areas in the first embodiment. A square in the live view image 501 indicates one special AF area 701. As illustrated in FIG. 8, a plurality of special AF areas 701 are allocated near the center of the live view image 501.

FIG. 9 illustrates an example of a screen displayed before a focusing operation is performed in a case in which there is no intra-driving-range area in the first embodiment. If a narrow driving range is set as indicated by a relatively short bar 605, the in-focus position may be located outside the driving range in all special AF areas 701. In this case, only special AF areas 701 are displayed and intra-range information indicating that the in-focus position is located within the driving range is not displayed.

FIG. 10 illustrates an example of a screen displayed before a focusing operation is performed in a case in which there are intra-driving-range areas in the first embodiment. If a wide driving range is set as indicated by the relatively long bar 603, the in-focus position may be located within the driving range in some special AF areas 701. In the live view image 501, for example, the subject image 801 is located at a position closer to the close-up side than the background. Therefore, the in-focus positions in special AF areas 701 that are at least partially overlaid on the subject image 801 are close to the close-up side and are located in the driving range, so these special AF areas are decided to be intra-driving-range areas 702. In each of these intra-driving-range areas 702, a particular color (intra-range information) indicating that the in-focus position is located within the driving range is displayed.

In-rang information is displayed in intra-driving-range areas 702 as described above, the user can visually decide whether a focus can be obtained for each special AF area 701. Therefore, imaging in which the AF function is used is facilitated.

FIG. 11 illustrates an example of a screen displayed after a focus has been obtained in the first embodiment. When a focusing operation is performed by, for example, half depressing the shutter button 161, the particular color (intra-range information) indicating that the in-focus position is located within the driving range is hided. In the special AF area 701 that is overlaid on the face of the subject image 801, a focus is obtained (that intra-driving-range area is referred to below as the focused area 703). In the focused area 703, a particular color (in-focus information) indicating that a focus has been obtained is displayed.

Example of Operation of the Imaging Apparatus

FIG. 12 is a flowchart illustrating an example of operation of the imaging apparatus 100. This operation is started when, for example, the imaging apparatus 100 is powered on.

The imaging apparatus 100 obtains the driving range of the lens from a manipulation signal (step S901). The imaging apparatus 100 converts a phase difference detected by the special AF module 130 to the amount Df of defocus by using equation (1) described above (step S902). The imaging apparatus 100 executes intra-driving-range area deciding processing to decide whether the special AF area 701 is an intra-driving-range area 702 (step S920). The imaging apparatus 100 then displays intra-range information in each special AF area 701 in the live view image (step S904). The imaging apparatus 100 decides whether the shutter button 161 has been half depressed (step S905). If the shutter button 161 has not been half depressed (the result in step S905 is No), the imaging apparatus 100 returns to step S902.

If the shutter button 161 has been half depressed (the result in step S905 is Yes), the imaging apparatus 100 hides the intra-range information (step S906). The imaging apparatus 100 then executes intra-driving-range area deciding processing again (step S920) and also executes focusing processing to obtain a focus (step S940). In the special AF area 701 in which a focus has been obtained, the imaging apparatus 100 displays a frame in particular color, the frame indicating that the special AF area 701 is a focused area 703 (step S908). The imaging apparatus 100 decides whether the shutter button 161 has been fully depressed (step S909). If the shutter button 161 has not been fully depressed (the result in step S909 is No), the imaging apparatus 100 returns to step S906.

Focused area deciding processing is executed after the shutter button 161 has been half depressed. This is because the subject may move before the shutter button 161 is fully depressed and intra-driving-range areas 702 may be thereby changed.

If the shutter button 161 has been fully depressed (the result in step S909 is Yes), the imaging apparatus 100 executes processing to record image data, that is, captures an image (step S910).

Although, in FIG. 12, an image is captured when the shutter button 161 is fully depressed, an image may be captured immediately after focusing processing has been completed, without waiting for the shutter button 161 to be fully depressed. In this case, execution of focused area deciding processing can be eliminated after the shutter button 161 has been half depressed, so the imaging apparatus 100 skips step S920.

FIG. 13 is a flowchart illustrating an example of intra-driving-range area deciding processing in the first embodiment. The intra-driving-range area deciding unit 230 in the imaging apparatus 100 calculates the distance from the current position $Z_P$ to the end position $Z_{FE}$ as the width of the driving range on the infinite side (step S921). The intra-driving-range area deciding unit 230 also calculates the distance from the current position $Z_P$ to the start position $Z_{NE}$ as the width of the driving range on the close-up side (step S922).

The intra-driving-range area deciding unit 230 sets, to an initial value (0, for example), variable i that indicates the number of processed special AF areas 701 (step S923). The intra-driving-range area deciding unit 230 decides whether the value of variable i is smaller than the total number of special AF areas 701 (step S924).

If the value of variable i is smaller than the total number of special AF areas 701 (the result in step S924 is Yes), the intra-driving-range area deciding unit 230 uses equation (2) described above to decide whether the in-focus position in the i-th special AF area 701 is located within the driving range (step S925). If the in-focus position in the i-th special AF area 701 is located within the driving range (the result in step S925 is Yes), the intra-driving-range area deciding unit 230 creates intra-range information indicating that the in-focus position in the i-th special AF area 701 is located within the driving range (step S926). The intra-driving-range area deciding unit 230 then increments the value of variable i (step S927).

In the case in which the in-focus position in the i-th special AF area 701 is not located within the driving range (the result in step S925 is No) or after execution of step S927, the intra-driving-range area deciding unit 230 returns to step S924.

If the value of variable i is greater than or equal to the total number of special AF areas 701 (the result in step S924 is No), the intra-driving-range area deciding unit 230 terminates the focused area deciding processing.

FIG. 14 is a flowchart illustrating an example of focusing processing in the first embodiment. The focusing unit 250 in the imaging apparatus 100 selects a to-be-focused area from the intra-driving-range areas 702 according to, for example, the face recognition result (step S941). To obtain a focus, the focusing unit 250 then drives the focus lens to the in-focus position according to the amount of defocus in the to-be-focused area (step S942). Upon completion of step S942, the focusing unit 250 terminates the focusing processing.

In the first embodiment of the present technology, as described above, the imaging apparatus 100 can decide for each special AF area 701 whether the in-focus position is located in the driving range according to the amount of defocus, and can display intra-range information accordingly. Thus, the user can decide whether a focus can be obtained in each special AF area 701, facilitating imaging in which the AF function is used.

Although the imaging apparatus 100 hides the intra-range information when a focusing operation is started, the intra-range information may be left displayed even in a period from a focusing operation is started until imaging is completed, as illustrated in FIG. 15. Thus, the user can visually recognize the intra-driving-range areas 702 even after a focusing operation has been started, facilitating next imaging.

Second Embodiment

Example of the Structure of the Imaging Apparatus

FIG. 16 is a block diagram illustrating an example of the structure of an imaging apparatus 100 in a second embodiment. In the imaging apparatus 100 in the first embodiment, the special AF module 130, which is disposed outside the imaging device 140, has detected a phase difference. In the imaging apparatus 100, however, the imaging device 140 may further include pixels that detect a phase difference (these pixels will be referred to below as image surface phase difference pixels), and the image surface phase difference pixels may detect a phase difference. The imaging apparatus 100 in the second embodiment differs from the imaging apparatus 100 in the first embodiment in that not only the special AF module 130 but also image surface phase difference pixels detect a phase difference.

The imaging device 140 in the imaging apparatus 100 in the second embodiment includes a plurality of image surface phase difference pixels 141 and a plurality of normal pixels 142. These image surface phase difference pixels 141 detect a phase difference by a method similar to the method used by the special AF module 130. The normal pixels 142, which are used to create an image, each output an electric potential according to the amount of light.

Example of the Structure of the Camera Control Unit

FIG. 17 is a block diagram illustrating an example of the structure of the camera control unit 200 in the second embodiment. The camera control unit 200 in the second embodiment differs from the camera control unit 200 in the first embodiment in that the amount of defocus is further detected from a phase difference detected by the image surface phase difference pixels 141.

The intra-driving-range area deciding unit 230 in the second embodiment creates intra-range information not only in each special AF area 701 but also in each image surface AF area 711. Furthermore, the focusing unit 250 in the second embodiment selects a to-be-focused area from the special AF areas 701 in which a focus is obtainable and the image surface AF areas 711, and performs a focusing operation in the selected area. Since precision in phase detection is generally higher in the special AF areas 701 than in the image surface AF areas 711, the intra-driving-range area deciding unit 230 may preferentially select a special AF area 701 as a to-be-focused area.

Example of the Structure of the Focus Detecting Unit

FIG. 18 is a block diagram illustrating an example of the structure of the focus detector 210 in the second embodiment. The focus detector 210 in the second embodiment includes an image surface AF module focus detecting unit 211 and a special AF module focus detecting unit 212.

The image surface AF module focus detecting unit 211 detects a phase difference in the image surface phase difference pixels 141 and detects an amount Df of defocus from the detected phase difference. The special AF module focus detecting unit 212 receives a phase difference from the special AF module 130 and detects an amount Df of defocus from the received phase difference. The image surface AF module focus detecting unit 211 and special AF module focus detecting unit 212 send the detected amount Df of defocus to the intra-driving-range area deciding unit 230.

FIG. 19 illustrates an example of the layout of AF areas in the second embodiment. A square in the live view image 501 indicates one special AF area 701 of the AF areas. A plus sing (+) indicates one image surface AF area 711, of the AF areas, in which a phase difference has been detected in an image surface phase difference pixels 141. Since, in general, the image surface phase difference pixel 141 is relatively freely placed in the imaging device 140, more image surface AF areas 711 can be placed than special AF areas 701 can be placed.

FIG. 20 illustrates an example of a screen displayed before a focusing operation is performed in a case in which there are intra-driving-range areas 702 in the second embodiment. In the special AF areas 701 and image surface AF area 711 that are at least partially overlaid on the subject image 801, if the in-focus position is within the driving range, these areas are decided to be intra-driving-range areas 702 and 712. In these intra-driving-range areas 702 and 712, a particular color (intra-range information) indicating that the in-focus position is located within the driving range is displayed. The colors displayed as the intra-range information in the intra-driving-range areas 702 and 712 may not be the same.

FIG. 21 illustrates an example of a screen displayed immediately after a focusing operation has been started in the second embodiment. When a focusing operation has been started by, for example, half depressing the shutter button 161, the imaging apparatus 100 hides the intra-range information and image surface AF areas 711. This is because more image surface AF areas 711 are placed than special AF areas 701 are placed, as described above, so if the image surface AF areas 711 are left displayed, the screen becomes hard to see. If the screen does not become hart to see, the imaging apparatus 100 may leave the image surface AF areas 711 displayed even after the shutter button 161 has been half depressed.

FIG. 22 illustrates an example of a screen displayed after a focus has been obtained in the second embodiment. When a focusing operation has been started by, for example, half depressing the shutter button 161, a focused area 713, which is one of the image surface AF areas 711, is further displayed. A frame in a particular color (focal information) that indicates that a focusing operation has been completed is displayed in the focused area 713. In the focused area 703, which is one of the special AF areas 701, another frame in a particular color (focal information) that indicates that a focusing operation has been completed is displayed.

FIG. 23 is a flowchart illustrating an example of an operation of the imaging apparatus 100 in the second embodiment. The operation of the imaging apparatus 100 in the second embodiment differs from the first embodiment in that steps S903 and S907 are further executed.

The imaging apparatus 100 converts the phase difference detected by the special AF module 130 to the amount Df of defocus (step S902), and further converts the phase difference detected in the image surface phase difference pixel 141 to the amount Df of defocus (step S903). If a focusing operation has been started (the result in step S905 is Yes), the imaging apparatus 100 hides the intra-range information (step S906) and further hides the image surface AF areas 711 (step S907).

FIG. 24 is a flowchart illustrating an example of intra-driving-range area deciding processing in the second embodiment. The intra-driving-range area deciding processing in the second embodiment differs from the first embodiment in that steps S931 to S935 are further executed.

If the value of variable i is larger than or equal to the total number of special AF areas 701 (the result in step S924 is No), the intra-driving-range area deciding unit 230 sets, to an initial value (0, for example), variable j that indicates the number of processed image surface AF areas 711 (step S931). The intra-driving-range area deciding unit 230 decides whether the value of variable j is smaller than the total number of image surface AF areas 711 (step S932).

If the value of variable j is smaller than the total number of special AF areas 701 (the result in step S932 is Yes), the intra-driving-range area deciding unit 230 uses equation (2) described above to decide whether the in-focus position in the j-th image surface AF area 711 is located within the driving range (step S933). If the in-focus position in the j-th image surface AF area 711 is located within the driving range (the result in step S933 is Yes), the intra-driving-range area deciding unit 230 creates intra-range information indicating that the in-focus position in the j-th image surface AF area 711 is located within the driving range (step S934). The intra-driving-range area deciding unit 230 then increments the value of variable j (step S935).

In the case in which the in-focus position in the j-th image surface AF area 711 is not located within the driving range (the result in step S933 is No) or after execution of step S935, the intra-driving-range area deciding unit 230 returns to step S932.

If the value of variable j is greater than or equal to the total number of image surface AF areas 711 (the result in step S932 is No), the intra-driving-range area deciding unit 230 terminates the intra-driving-range area deciding processing.

In the second embodiment, as described above, the imaging apparatus 100 can decide for each special AF area 701 and for each image surface AF area 711 whether the in-focus position is located in the driving range, and can display intra-range information accordingly. Thus, the user can decide whether a focus can be obtained in each image surface AF area 711, more image surface AF areas 711 than special AF areas 701 being generally allocated, besides in a special AF area 701, further facilitating imaging in which the AF function is used.

Although the imaging apparatus 100 hides the intra-range information in each special AF area 701 when a focusing operation is started, the intra-range information may be left displayed in the special AF area 701 even in a period from a focusing operation is started until imaging is completed, as illustrated in FIG. 25. Thus, the user can visually recognize the current intra-driving-range area 702, facilitating next imaging.

Although the imaging apparatus 100 uses a plus sing (+) to indicate one image surface AF area 711, another symbol may be used. For example, as illustrated in FIG. 26, a square smaller than the special AF area 701 may be used to indicate one image surface AF area 711.

In the embodiments described above, examples have been described to embody the present technology, so there are a correspondence relationship between the matter in the embodiments and the matter specifying the invention in the claims. Similarly, there is a correspondence relationship between the matter specifying the invention in the claims and items, in the matter in the embodiments, that have the same names as in the matter specifying the invention in the claims. However, the present technology is not limited to the embodiments but can be implemented by modifying the embodiments in various ways without departing from the intended scope of the present technology.

(1) An information processing system comprising:
circuitry configured to
acquire information indicating whether at least one of plurality of areas included in a captured image captured by a capturing device are focusable; and
issue a signal to control a display to display first information indicating whether each of the plurality of areas are focusable.

(2) The information processing system of (1), wherein the circuitry is configured to control the display to display a plurality of graphic indicia corresponding to each of the plurality of areas on an image captured by the capturing device.

(3) The information processing system of (2), wherein the circuitry is configured to apply a predetermined effect to each of the plurality of graphic indicia as the first information based on whether the each of the plurality of areas are focusable.

(4) The information processing system of (3), wherein the circuitry is configured to control the display to change the indicia according to a focusing operation.

(5) The information processing system of (4), wherein the circuitry is configured to hide the indicia when the focusing operation has been started.

(6) The information processing system of (1), wherein the circuitry is configured to control the display to display second information indicating a driving range of the lens included in the image capturing device.

(7) The information processing system of (6), wherein the circuitry is configured to control the display to display the second information with the first information.

(8) The information processing system of (7), wherein the circuitry is configured to control the display to display, at the same time, the first information, the second information and information related to a setting parameter of the capturing device.

(9) The information processing system of (7), wherein the second information includes a start position indicator indicating a start position of the driving range of the lens, an end position indicator indicating an end position of the driving range of the lens and a current position indicator indicating a current position of the lens.

(10) The information processing system of (6), wherein the second information includes a bar having a length according to the driving range of the lens.

(11) The information processing system of (1), wherein the circuitry is configured to:
detect an object in the captured image data; and
set the plurality of areas based on the detected object in the captured image data.

(12) The information processing system of (11), wherein the object is a part of a human body.

(13) The information processing system of (1), wherein the circuitry is configured to obtain a driving range of a lens included in the image capturing device.

(14) The information processing system of (13), wherein the circuitry is configured to determine whether in-focus position of each of the plurality of areas are in a focusable position based on the driving range of the lens.

(15) The information processing system of (14), wherein the circuitry is configured to control the display to display information indicating whether in-focus position of each of the plurality of areas are in a focusable position based on the determining.

(16) The information processing system of (13), wherein the circuitry is configured to detect a distance between a current position of the lens and an in-focus position of the lens for each of the plurality of areas.

(17) The information processing system of (16), wherein the circuitry is configured to detect whether the in-focus position of the lens is within the driving range of the lens for each of the plurality of areas based on the driving range of the lens and the distance between the current position of the lens and the in-focus position of the lens for each of the plurality of areas.

(18) The information processing system of (1), wherein the information processing system includes:

the circuitry;
the display;
the image capturing device; and
a memory configured to store an image captured by the image capturing device.

(19) An information processing method performed by an information processing system, the method comprising:
acquiring information indicating whether at least one of plurality of areas included in a captured image are focusable; and
issuing a signal to control a display to display first information indicating whether each of the plurality of areas are focusable.

(20) A non-transitory computer-readable medium including computer-program instruction, which when executed by an information processing system, cause the information processing system to:
acquire information indicating whether at least one of plurality of areas included in a captured image are focusable; and
issue a signal to control a display to display first information indicating whether each of the plurality of areas are focusable.

(21) An imaging control apparatus that includes:
a driving range obtaining unit that obtains the driving range of a lens;
a detector that detects a distance between the current position of the lens and the in-focus position of the lens for each of a plurality of detection areas in an image formed by the lens;
an intra-driving-range area deciding unit that decides whether the in-focus position is located within the driving range in each of the plurality of detection areas, according to the detected distance and the current position; and
a display control unit that causes a display unit to display intra-range information in each of the plurality of detection areas, the intra-range information indicating whether the in-focus position is located within the driving range.

(22) In the imaging control apparatus described in (21) above, the display control unit causes the display unit to display the intra-range information in each of the plurality of detection areas during a period from when a decision has been made as to whether the in-focus position is located within the driving range until a focusing operation starts.

(23) In the imaging control apparatus described in (21) or (22) above, the display control unit causes the display unit to display the intra-range information in each of the plurality of detection areas during a period from when a decision has been made as to whether the in-focus position is located within the driving range until the image formed by the lens is captured.

(24) In the imaging control apparatus described in any one of (21) to (23) above, the plurality of detection areas include a plurality of main detection areas and more sub-detection areas than the number of the plurality of main detection areas; the display control unit causes the display unit to display the intra-range information in each of the plurality of main detection areas and in each of the plurality of sub-detection areas during a period from when a decision has been made as to whether the in-focus position is located within the driving range until a focusing operation starts and causes the display unit to display the plurality of main detection areas during a period from when the focusing operation starts until the image formed by the lens is captured.

(25) In the imaging control apparatus described in (24) above, the display control unit causes the display unit to display the plurality of sub-detection areas having a different size from the plurality of main detection areas.

(26) In the imaging control apparatus described in any one of (21) to (25) above, if the driving range of the lens has been changed from its initial range, the display control unit obtains the driving range after the change; the display control unit causes the display unit to display an area indicating the obtained driving range and an area indicating the initial range.

(27) In the imaging control apparatus described in any one of (21) to (26) above, the intra-driving-range area deciding unit decides whether the in-focus position is located within the driving range, depending on whether the distance between the current position and the start position or end position of the driving range is longer than or equal to the detected distance.

(28) In the imaging control apparatus described in any one of (21) to (27) above, the display control unit causes the display unit to display a particular color indicating that the in-focus position is located within the driving range, as the intra-range information.

(29) In the imaging control apparatus described in any one of (21) to (28) above, the imaging control apparatus further includes a focusing unit that performs a focusing operation in which the lens is driven to the in-focus position according to the distance detected in a detection area, which is one of the plurality of detection areas, in which the in-focus position has been decided to be within the driving range, and the display control unit causes the display unit to display focal information indicating whether a focus has been obtained in each of the plurality of detection areas.

(30) An imaging apparatus that includes:
a driving range obtaining unit that obtains the driving range of a lens;
a detector that detects a distance between the current position of the lens and the in-focus position of the lens for each of a plurality of detection areas in an image formed by the lens;
an intra-driving-range area deciding unit that decides whether the in-focus position is located within the driving range in each of the plurality of detection areas, according to the detected distance and the current position;
a display control unit that causes a display unit to display intra-range information in each of the plurality of detection areas, the intra-range information indicating whether the in-focus position is located within the driving range; and
an imaging unit that captures an image formed by the lens.

(31) An imaging control method that includes
a driving range obtaining step by which a driving range obtaining unit obtains the driving range of a lens;
a detecting step by which a detector detects a distance between the current position of the lens and the in-focus position of the lens for each of a plurality of detection areas in an image formed by the lens;
an intra-driving-range area deciding step by which an intra-driving-range area deciding unit decides whether the in-focus position is located within the driving range in each of the plurality of detection areas, according to the detected distance and the current position; and
a display controlling step by which a display control unit causes a display unit to display intra-range information in each of the plurality of detection areas, the intra-range information indicating whether the in-focus position is located within the driving range.

The present disclosure contains subject matter related to that disclosed in Japanese Priority Patent Application JP 2012-199049 filed in the Japan Patent Office on Sep. 11, 2012, the entire contents of which are hereby incorporated by reference.

REFERENCE SIGNS LIST 100 imaging apparatus
110 imaging lens
120 fixed half mirror
130 special AF module
140 imaging device
141 image surface phase difference pixel
142 normal pixel
150 image processing unit
160 manipulation unit
161 shutter button
162 focus limiter switch
163 cross-key
170 display unit
180 image recording unit
200 camera control unit
210 focus detector
211 image surface AF module focus detecting unit
212 special AF module focus detecting unit
220 driving range obtaining unit
230 intra-driving-range area deciding unit
231 intra-driving-range area deciding circuit
232 defocus buffer
240 image recognizing unit
250 focusing unit
251 to-be-focused area selecting unit
252 focus lens control unit
260 display control unit
270 imaging control unit

The invention claimed is:
1. An information processing system, comprising:
at least one processor configured to:
determine whether each area of a plurality of areas included in an image is focusable with respect to a driving range of a focus lens of a capturing device, wherein the image is captured through the focus lens of the capturing device, and the determination is based on phase difference information obtained for each area of the plurality of areas in the image; and
control a display screen to:
display the plurality of areas prior to an operation to drive the focus lens, wherein the plurality of areas comprises a plurality of special auto focus (AF) areas and a plurality of image surface AF areas;
display focusable area information prior to the operation to drive the focus lens, wherein the focusable area information indicates that each area of the plurality of areas is focusable;
hide each of the plurality of image surface AF areas based on a start of the operation to drive the focus lens;
display an image surface AF area of the plurality of hidden image surface AF areas based on completion of the operation to drive the focus lens; and
display a first frame of a first color in one of the plurality of special AF areas concurrently with a second frame of a second color in the displayed image surface AF area, wherein the display of the first frame of the first color and the second frame of the second color indicates the completion of the operation to drive the focus lens.

2. The information processing system of claim 1, wherein the at least one processor is further configured to apply an effect to each of the plurality of areas on the display screen as the focusable area information, based on the determination.

3. The information processing system of claim 1, wherein the at least one processor is further configured to control the display screen to display first information indicating the driving range of the focus lens included in the capturing device.

4. The information processing system of claim 3, wherein the at least one processor is further configured to control the display screen to display the first information with the focusable area information.

5. The information processing system of claim 4, wherein the at least one processor is further configured to control the display screen to display, at the same time, the first information, the focusable area information and second information related to a setting parameter of the capturing device.

6. The information processing system of claim 4, wherein the first information includes a start position indicator indicating a start position of the driving range of the focus lens, an end position indicator indicating an end position of the driving range of the focus lens, and a current position indicator indicating a current position of the focus lens.

7. The information processing system of claim 3, wherein the first information includes a bar having a length according to the driving range of the focus lens.

8. The information processing system of claim 1, wherein the at least one processor is further configured to:
    detect an object in the captured image; and
    set the plurality of areas based on the detected object in the captured image.

9. The information processing system of claim 8, wherein the object is a part of a human body.

10. The information processing system of claim 1, wherein the at least one processor is further configured to obtain the driving range of the focus lens included in the capturing device.

11. The information processing system of claim 10, wherein the at least one processor is further configured to determine whether an in-focus position of each of the plurality of areas is in a focusable position based on the driving range of the focus lens.

12. The information processing system of claim 11, wherein the at least one processor is further configured to control the display screen to display information indicating whether the in-focus position of each of the plurality of areas is in the focusable position.

13. The information processing system of claim 10, wherein the at least one processor is further configured to detect a distance between a current position of the focus lens and an in-focus position of the focus lens for each of the plurality of areas.

14. The information processing system of claim 13, wherein the at least one processor is further configured to detect whether the in-focus position of the focus lens is within the driving range of the focus lens for each of the plurality of areas based on the driving range of the focus lens and the distance between the current position of the focus lens and the in-focus position of the focus lens for each of the plurality of areas.

15. The information processing system of claim 1, further comprising:
    the display screen;
    the capturing device; and
    a memory configured to store the image.

16. The information processing system of claim 1, wherein the determination is further based on a current position of the focus lens of the capturing device.

17. The information processing system of claim 1, wherein the plurality of special AF areas partially overlaps with at least one of the plurality of image surface AF areas.

18. The information processing system of claim 1, wherein a number of the plurality of special AF areas is less than a number of the plurality of image surface AF areas.

19. The information processing system of claim 1, wherein the at least one processor is further configured to control the display screen based on the plurality of special AF areas and the plurality of image surface AF areas.

20. The information processing system of claim 1, wherein the at least one processor is further configured to control the display screen to display the focusable area information, regarding the plurality of special AF areas, subsequent to the operation until the capture of the image is completed.

21. The information processing system of claim 1, wherein the at least one processor is further configured to control the display screen to:
    display a plurality of first squares as the plurality of special AF areas; and
    display a plurality of second squares as the plurality of image surface AF areas, wherein a size of each of the plurality of second squares is less than a size of each of the plurality of first squares.

22. The information processing system of claim 1, wherein the at least one processor is further configured to:
    control the display screen to hide the displayed focusable area information based on the start of the operation to drive the focus lens; and
    determine the plurality of special AF areas is a plurality of intra-driving-range areas based on the plurality of hidden image surface AF areas and the hidden focusable area information.

23. An information processing method, comprising:
    in an information processing system:
    determining whether each area of a plurality of areas included in an image is focusable with respect to a driving range of a focus lens of a capturing device, wherein the image is captured through the focus lens of the capturing device, and the determination is based on phase difference information obtained for each area of the plurality of areas in the image; and
    controlling a display screen to:
        display the plurality of areas prior to an operation to drive the focus lens, wherein the plurality of areas comprises a plurality of special auto focus (AF) areas and a plurality of image surface AF areas;
        display focusable area information prior to the operation to drive the focus lens, wherein the focusable area information indicates that each area of the plurality of areas is focusable;
        hide each of the plurality of image surface AF areas based on a start of the operation to drive the focus lens;
        display an image surface AF area of the plurality of hidden image surface AF areas based on completion of the operation to drive the focus lens; and
        display a first frame of a first color in one of the plurality of special AF areas concurrently with a second frame of a second color in the displayed image surface AF area, wherein the display of the first frame of the first color and the second frame of the second color indicates the completion of the operation to drive the focus lens.

24. A non-transitory computer-readable medium having stored thereon computer-executable instructions that, when executed by a processor, cause the processor to execute operations, the operations comprising:

determining whether each area of a plurality of areas included in an image is focusable with respect to a driving range of a focus lens of a capturing device, wherein the image is captured through the focus lens of the capturing device, and the determination is based on phase difference information obtained for each area of the plurality of areas in the image; and controlling a display screen to:

display the plurality of areas prior to an operation to drive the focus lens, wherein the plurality of areas comprises a plurality of special auto focus (AF) areas and a plurality of image surface AF areas;

display focusable area information prior to the operation to drive the focus lens, wherein the focusable area information indicates that each area of the plurality of areas is focusable;

hide each of the plurality of image surface AF areas based on a start of the operation to drive the focus lens;

display an image surface AF area of the plurality of hidden image surface AF areas based on completion of the operation to drive the focus lens; and display a first frame of a first color in one of the plurality of special AF areas concurrently with a second frame of a second color in the displayed image surface AF area, wherein the display of the first frame of the first color and the second frame of the second color indicates the completion of the operation to drive the focus lens.

* * * * *